(12) United States Patent
Pearce

(10) Patent No.: US 7,359,368 B1
(45) Date of Patent: Apr. 15, 2008

(54) SYSTEM AND METHOD FOR ROUTING CALLS USING DIALING PARTITIONS

(75) Inventor: Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/579,399

(22) Filed: May 25, 2000

(51) Int. Cl.
*H04L 12/66* (2006.01)
*H04L 12/28* (2006.01)

(52) U.S. Cl. .................................. 370/352; 370/401
(58) Field of Classification Search ............... 370/352, 370/401; 379/221.01, 221.14, 900, 901, 379/200
See application file for complete search history.

(56) References Cited

U.S. PATENT DOCUMENTS

| | | | |
|---|---|---|---|
| 4,748,658 A | 5/1988 | Gopel et al. | |
| 4,757,267 A * | 7/1988 | Riskin .................. | 379/114.24 |
| 4,797,915 A | 1/1989 | Bowker et al. | |
| 5,430,792 A | 7/1995 | Jesurum et al. | |
| 5,652,866 A | 7/1997 | Aldred et al. .............. | 395/500 |
| 5,790,647 A | 8/1998 | Gessel ....................... | 379/201 |
| 5,867,494 A | 2/1999 | Krishnaswamy et al. ... | 370/352 |
| 5,950,198 A | 9/1999 | Fallas et al. | |
| 6,144,727 A | 11/2000 | Mashinsky ............... | 379/114.1 |
| 6,161,008 A | 12/2000 | Lee et al. .................... | 455/414 |
| 6,205,214 B1 | 3/2001 | Culli et al. ................. | 379/220 |
| 6,259,779 B1 | 7/2001 | Council et al. ............. | 379/121 |
| 6,275,574 B1 * | 8/2001 | Oran ..................... | 379/201.01 |
| 6,282,194 B1 | 8/2001 | Cheesman et al. .......... | 370/356 |
| 6,304,574 B1 | 10/2001 | Schoo et al. ................ | 370/401 |
| 6,304,576 B1 | 10/2001 | Corley et al. ............... | 370/408 |
| 6,353,610 B1 | 3/2002 | Bhattacharya et al. ...... | 370/352 |
| 6,363,065 B1 | 3/2002 | Thornton et al. ........... | 370/352 |
| 6,366,576 B1 * | 4/2002 | Haga ......................... | 370/352 |
| 6,389,130 B1 | 5/2002 | Shenoda et al. ........ | 379/221.08 |
| 6,498,791 B2 * | 12/2002 | Pickett et al. ............... | 370/353 |
| 6,522,732 B1 | 2/2003 | Pullen et al. .......... | 379/112.02 |
| 6,560,326 B1 | 5/2003 | Clark .................... | 379/221.09 |
| 6,570,855 B1 | 5/2003 | Kung et al. ................. | 370/237 |
| 6,574,012 B1 | 6/2003 | Kagawa ..................... | 358/434 |
| 6,584,093 B1 | 6/2003 | Salama et al. .............. | 370/351 |
| 6,597,687 B1 | 7/2003 | Rao .......................... | 370/352 |
| 6,614,780 B2 * | 9/2003 | Hakim et al. ............... | 370/352 |
| 6,614,902 B1 | 9/2003 | Rizzetto ................ | 379/265.11 |

(Continued)

OTHER PUBLICATIONS

Cisco Systems, Inc.; "System Description for the Cisco Communications Network Version 2.1;" Cisco Communications Network; all.

*Primary Examiner*—Kevin C. Harper
(74) *Attorney, Agent, or Firm*—Baker Botts L.L.P.

(57) ABSTRACT

A method of routing calls using dialing partitions includes receiving a call request at a first call manager from a first device coupled to a packet-based network. The call request includes a telephone number that is associated with a second device coupled to the packet-based network. The method also includes accessing a dialing partition table based on a partition search space associated with the first device. The method further includes determining a routing target that is associated with one or more telephone numbers in the dialing partition table that match the telephone number in the call request. In addition, the method also includes communicating the call request to the routing target.

58 Claims, 14 Drawing Sheets

U.S. PATENT DOCUMENTS

| | | |
|---|---|---|
| 6,657,989 B1 | 12/2003 | Hilsenrath .................. 370/351 |
| 6,671,262 B1 | 12/2003 | Kung et al. |
| 6,711,159 B1 | 3/2004 | Grabelsky et al. |
| 6,718,482 B2 | 4/2004 | Sato et al. |
| 6,751,459 B1 | 6/2004 | Lee et al. ................... 455/445 |
| 6,760,324 B1 | 7/2004 | Scott et al. .................. 370/352 |
| 6,760,416 B1 | 7/2004 | Banks et al. |
| 6,785,223 B1 | 8/2004 | Korpi et al. |
| 6,925,076 B1 | 8/2005 | Dalgic et al. |
| 2002/0150080 A1 | 10/2002 | Bhattacharya et al. ...... 370/351 |

* cited by examiner

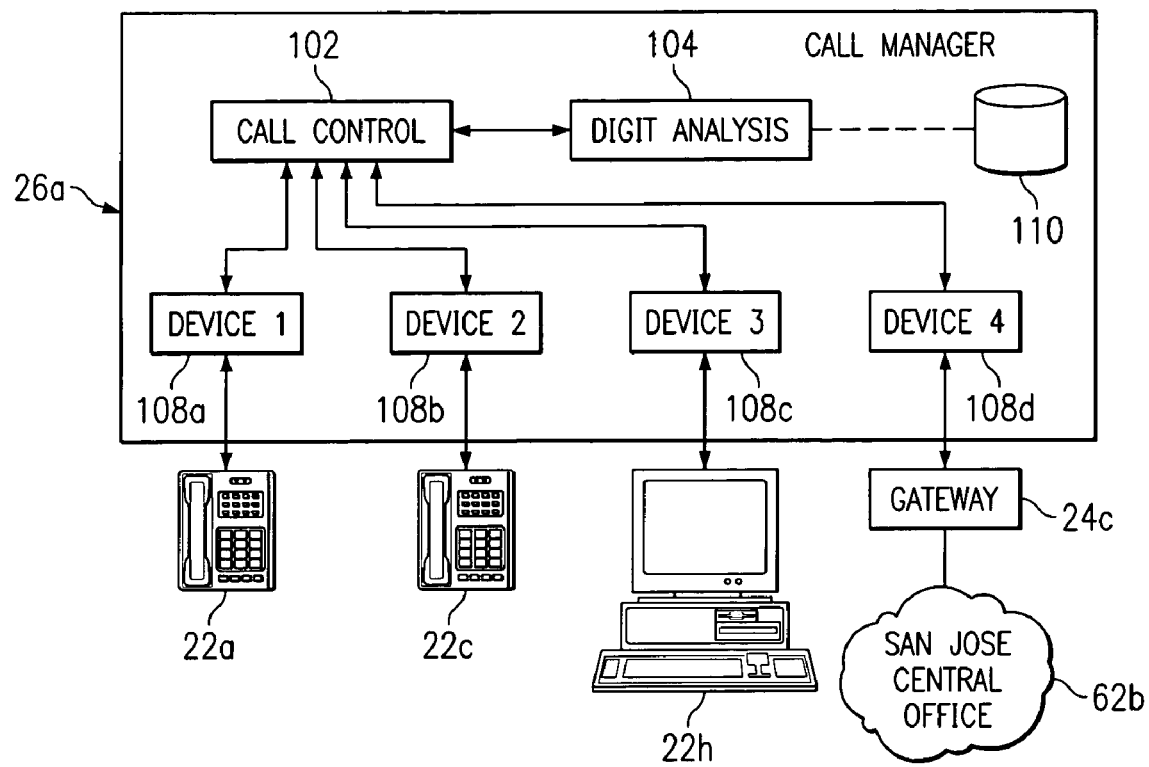

*FIG. 6A*
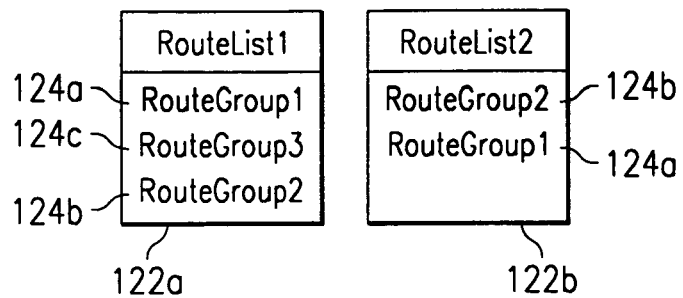
*FIG. 6B*
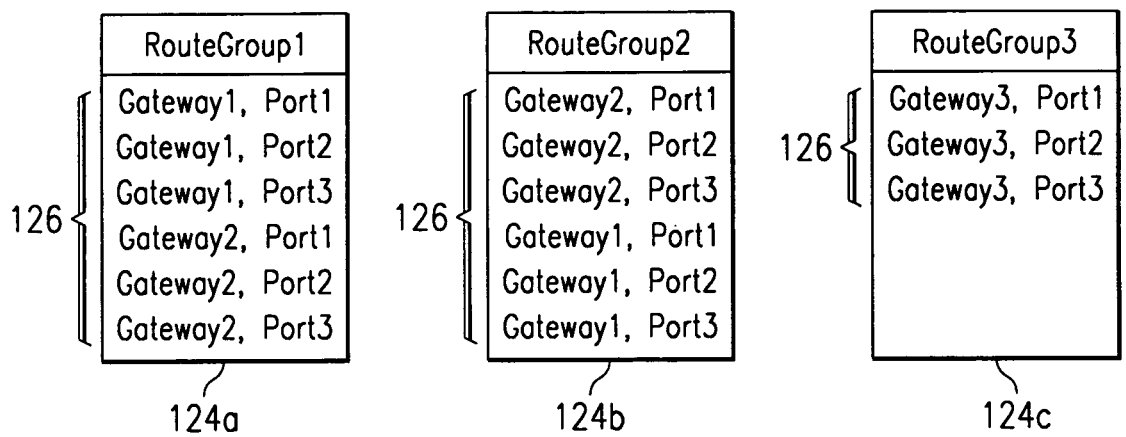
*FIG. 10*
| 1000 | 1.lcp.1 |
|---|---|
| 1001 | 1.dp.1 |
| 1005 | 1.dp.2 |
| 2008 | 1.dp.3 |
| 2001 | 2.dp.1 |
| 1002 | 2.dp.2 |
| 2002 | 2.dp.3 |
112     114

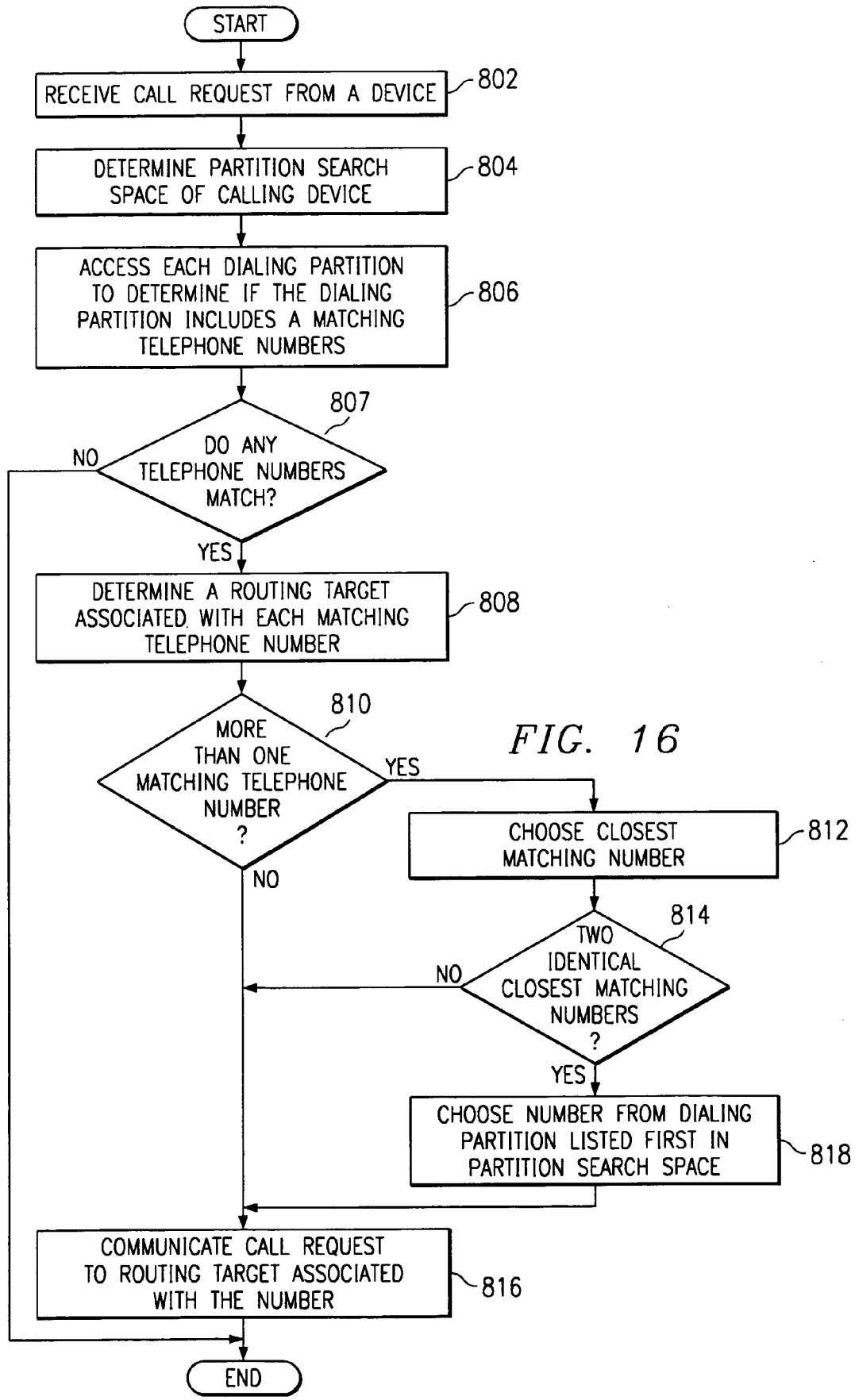

SYSTEM AND METHOD FOR ROUTING CALLS USING DIALING PARTITIONS

CROSS-REFERENCE TO RELATED APPLICATIONS

This application is filed concurrently with the following commonly-owned applications:

SYSTEM AND METHOD FOR DEVICE REGISTRATION REPLICATION IN A COMMUNICATION NETWORK, application Ser. No. 09/579,348;

SYSTEM AND METHOD FOR ROUTING CALLS ACROSS CALL MANAGERS USING A ROUTE PLAN, application Ser. No. 09/579,331;

SYSTEM AND METHOD FOR PROVIDING SHARED LINE APPEARANCES IN A DISTRIBUTED CALL ROUTING, application Ser. No. 09/579,002; and SYSTEM AND METHOD FOR DISTRIBUTED CALL ROUTING, application Ser. No. 09/579,330.

TECHNICAL FIELD OF THE INVENTION

This invention relates generally to the field of telecommunications, and more specifically to a system and method for routing calls using dialing partitions.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Packet (VoP). Since many LANs and WANs transmit computer data using packet protocols, such as the Internet Protocol (IP), VoP uses this existing technology to transmit voice and fax signals by converting these signals into digital data and encapsulating the data for transmission over a packet-based network.

SUMMARY OF THE INVENTION

In accordance with the present invention, a system and method for distributed call routing is provided that substantially eliminates or reduces disadvantages or problems associated with previously developed systems and methods. In particular, the present invention contemplates a system and method for routing calls in which dialing partitions and partition search spaces direct the routing of a call based on one or more characteristics of the device placing the call or based on the destination of the call.

In one embodiment of the present invention, a method of routing calls using dialing partitions includes receiving a call request at a first call manager from a first device coupled to a packet-based network. The call request includes a telephone number that is associated with a second device coupled to the packet-based network. The method also includes accessing a dialing partition table based on a partition search space associated with the first device. The method further includes determining a routing target that is associated with one or more telephone numbers in the dialing partition table that match the telephone number in the call request. In addition, the method also includes communicating the call request to the routing target.

In another embodiment of the present invention, a call manager includes a call control module that receives a call request from a first device that is coupled to a packet-based network. The call request includes a telephone number that is associated with a second device coupled to the packet-based network. The call manager also includes a digit analysis module that receives the telephone number included in the call request from the call control module and that accesses one or more dialing partition tables based on a partition search space associated with the first device. The digit analysis module determines a routing target that is associated with one or more telephone numbers in the dialing partition tables that match the telephone number in the call request. The call control module receives the routing target from the digit analysis module and communicates the call request to the routing target.

Technical advantages of the present invention include a system and method for routing calls that allow for selective routing of calls based on characteristics of the device placing the call or based on the destination of the call. For example, users of particular telephony devices may be allowed to place long distance calls, while users of other telephony devices may not be allowed to place such calls. Selected users may also be restricted from placing other types of calls. Furthermore, if two tenants share the same network and their telephony devices are controlled by the same call manager, the telephony devices associated with each tenant may be prevented from calling telephony devices associated with the other tenant. In addition, telephony devices of one tenant may be given different calling rights than the telephony devices of the other tenant.

Other technical advantages include the ability to specify how a call should be routed based on the destination of the call. For example, telephony devices in a packet-based network may be coupled to telephony devices in a circuit-switched network, such as the public switched telephone network (PSTN), using one or more gateway devices. By locating these gateway devices in a number of cities and coupling the gateway devices using the packet-based network, long distance charges may be avoided by routing inter-city calls over the packet-based network rather than over the PSTN. The present invention provides a method of routing such calls to the appropriate gateway device to avoid or reduce long distance charges. Calls also may be routed to certain gateway devices to manage the call load on other gateway devices.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 2 illustrates an exemplary call manager in accordance with one embodiment of the present invention;

FIG. 3 illustrates an exemplary registration information table maintained by a call manager in accordance with one embodiment of the present invention;

FIGS. 6A and 6B illustrate exemplary route lists and route groups, respectively, for use in routing calls to gateway devices;

FIG. 10 illustrates a registration information table 110a including line control process PIDs;

FIG. 16 illustrates a method of routing a call using dialing partition tables of FIG. 14.

DETAILED DESCRIPTION OF THE INVENTION

Figure 1:
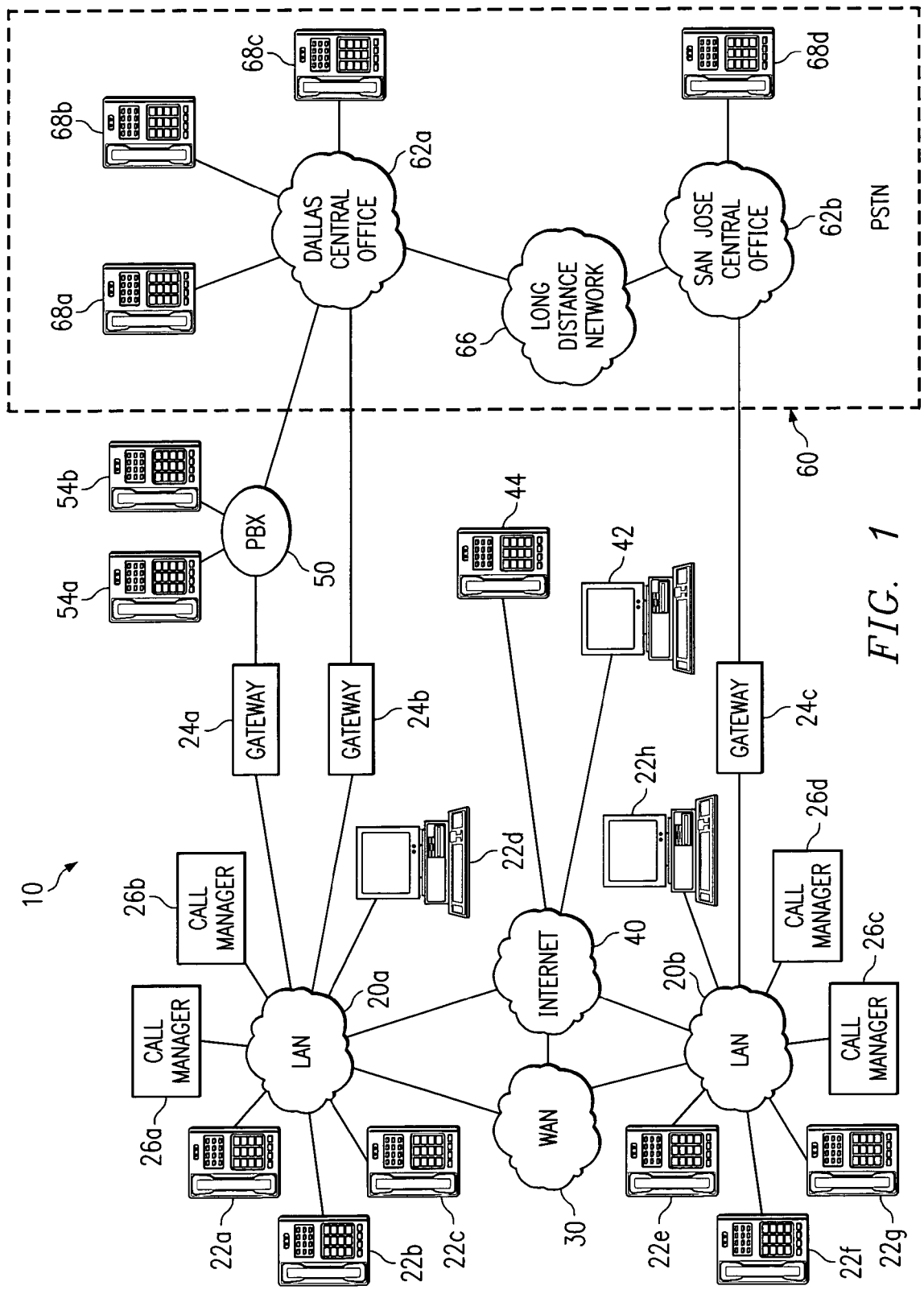
FIG. 1 illustrates an exemplary communication network in accordance with one embodiment of the present invention.

FIG. 1 illustrates an exemplary communication network 10. Although a specific communication network is illustrated in FIG. 1, the term "communication network" should be interpreted as generically defining any network capable of transmitting telecommunication signals, data, and/or messages. In the illustrated embodiment, communication network 10 includes a plurality of local area networks (LANs) 20 interconnected using a wide area network (WAN) 30. Each LAN 20 is a computer data network that is further operable to transmit audio and/or video telecommunication signals. In a particular embodiment, LANs 20 are Internet Protocol (IP) networks. However, LANs 20 may be any type of network that allows the transmission of audio and video telecommunication signals and data, as well as traditional data communications. Therefore, although subsequent description will primarily focus on IP communications, it should be understood that other appropriate method of transmitting telecommunications over a data network, such as a Frame Relay, ATM, or other packet-based network, are also included within the scope of the present invention.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateway devices 24. For example, LAN 20a is coupled to a private branch exchange (PBX) 50 through a gateway device 24a. PBX 50 includes a plurality of extension telephones or subscriber sets 54a and 54b to which PBX 50 directs incoming telephone calls. Gateway device 24a may be either an analog or a digital gateway device depending on the type of PBX 50 to which it is coupled.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunications equipment that are located across the country. For example, central offices (COs) 62 connect telephone customers, such as residences and businesses, to PSTN 60. In the illustrated embodiment, LANs 20 are coupled to selected central offices 62 through the use of gateway devices 24b and 24c. The operation of the gateway devices 24 in communication network 10 is described in further detail below.

Central offices 62 are coupled through a long distance network 66 that allows communication between residences and businesses coupled to central offices in different areas, such as central office 62a in Dallas and central office 62b in San Jose. The entity that owns the communication lines comprising long distance network 66 (there are typically several different entities, each having their own communication lines) charges a fee for the use of these lines. However, one advantage of IP telephony is that a company owning (or leasing) LANs 20 and WAN 30 may avoid such fees by using WAN 30 to transmit calls between LANs 20 in different areas. Internet 40 may also be used to transmit calls.

IP networks and other packet-based networks transmit data (including voice and video data) by placing the data in packets and sending each packet individually to the selected destination. Unlike a circuit-switched network (like PSTN 60), dedicated bandwidth is not required for the duration of a call or fax transmission over LANs 20, WAN 30 or Internet 40. Instead, each telephony device sends packets across the network as they become available for transmission. This feature makes bandwidth available for other data when voice or fax data is not being transmitted.

The technology that allows telecommunications to be transmitted over an IP network (as well as other packet-based networks) may be referred to as Voice over Packet (VoP). IP telephony devices 22 have the capability of encapsulating a user's voice (or other media inputs) into IP packets so that the voice can be transmitted over LANs 20, WAN 30 and/or Internet 40. IP telephony devices 22 may include telephones, fax machines, computers running telephony software (such as MICROSOFT NETMEETING), gateway devices, H.323-compatible devices, or any other device capable of performing telephony functions in an IP network.

Communication network 10 includes a plurality of call managers 26 that control one or more IP telephony devices 22. A call manager 26 is an application that controls call processing, routing, telephone features and options (such as call hold, call transfer and caller ID), device configuration, and other telephony functions and parameters within communication network 10. A call manager 26 can control one or more of the IP telephony devices 22 coupled to the same LAN 20 to which it is coupled, and a call manager 26 may also control IP telephony devices 22 located elsewhere in communications network 10. For example, call manager 26a is capable of controlling telephony devices on LAN 20b. A call manager 26 may be implemented as software executing on one or more computers coupled to communication network 10. The call manager software may be embodied in any type of computer-readable medium including, but not limited to, hard drives, diskettes, CD-ROMs, DVD-ROMs, or other optical or magnetic storage devices.

When an IP telephony device 22 is connected to a LAN 20 or elsewhere in communication network 10 (or when it otherwise comes on-line), the telephony device 22 may be assigned an IP address using Dynamic Host Control Protocol (DHCP) or another similar protocol or technique. The telephony device 22 then registers with any call manager 26 with which it can communicate using its telephone number and its IP address. Alternatively, the telephony device 22 may request that it be assigned a telephone number and/or an IP address. The term "telephone number" should be understood to include any appropriate combination of digits or characters or any other appropriate method of identifying a telephony device. The telephony device may also report its Media Access Control (MAC) address and/or its device name. The call manager 26 with which a telephony device 22 has registered creates an internal device process, described below, that is used to route signaling to the telephony device 22 from call managers 26 or other telephony devices 22.

The ability of a call manager 26 to control any IP telephony device 22 in communication network 10 allows a call processing environment in which control of devices may distributed dynamically in response to changes in communication network 10. For example, if a call manager 26 goes off-line, the telephony devices 22 controlled by that call manager 26 can connect and register with an alternative call manager 26 in communication network 10. Likewise, if a communication link between a telephony device 22 and a call manager 26 goes down, the telephony device 22 may connect and register with an alternative call manager 26 to which there is an operable communication path. Furthermore, the distributed control of telephony devices 22 also provides for network scalability and load-sharing by allowing telephony devices 22 to be controlled by any call manager 26, regardless of physical location, in order to avoid excess load on a particular call manager 26 when new telephony devices 22 come on-line or to provide load balancing between call managers 26.

FIG. 2 illustrates an exemplary call manager 26a. It should be understood that any appropriate combination of telephony devices 22 and/or gateway devices 24 in communication network 10 may be controlled by call manager 26a. In the illustrated embodiment, call manager 26a controls telephony devices 22a and 22c, which are coupled to LAN 20a, and telephony device 22h and gateway device 24c, which are coupled to LAN 20b.

Call manager 26a includes a number of internal processes that are used to manage and control communication to and from devices 22, 24. These processes include, but are not limited to a call control module 102, a digit analysis module 104, and one or more device processes 108. Call control module 102 is responsible for establishing calls between multiple IP telephony devices 22 or between one or more IP telephony devices 22 and one or more external telephony devices, such as PBX telephony devices 54 and PSTN telephony devices 68.

In the illustrated embodiment, each device 22, 24 has an associated device process 108. Signaling to and from devices 22, 24 is first passed through the associated device process 108, which acts as a signaling contact point in call manager 26a to a device 22, 24. For example, signaling sent from call control module 102 of call manager 26a or signaling sent from another call manager 26 is directed to the appropriate device process 108, which then communicates the signaling to the appropriate device 22, 24. Likewise, signaling sent from a device 22, 24 is first sent to the associated device process 108, and is then communicated to the appropriate destination. Signaling between devices 22, 24 and between call managers may be performed using any appropriate signaling method including, but not limited to, Signal Distribution Layer (SDL) signaling links or tunneling trunks, as described below.

When a device 22, 24 coupled to a LAN 20 or any other appropriate location in communication network 10 comes on-line, the device 22, 24 registers with a call manager 26. As described above, a device 22, 24 can register with any call manager 26 with which the device 22, 24 can communicate by sending the call manager 26 a registration request. A call control module 102, or any other appropriate component of call manager 26, receives the registration requests. Call control module 102 (or another appropriate component) generates a device process 108 for the registering device 22, 24 and assigns the device process 108 a process identification number or string (PID).

Call control module 102 communicates the registering device's telephone number and the associated device process PID to digit analysis module 104. Digit analysis module 104 associates the telephone number and the PID in a registration information table 110 or any other appropriate database. Registration information table 110 may also include any other suitable registration information associated with the registering device 22, 24, such as the device name, IP address or MAC address of the device 22, 24.

When a device 22, 24 wishes to establish communications with another device in communication network 10, the device 22, 24 typically communicates one or more digits to the call manager 26 controlling device 22, 24. The digits identify the device with which communication is requested. For example, a telephony device 22 may send a call manager 26 one or more digits indicating the telephone number of an IP telephony device 22 or a non-IP telephony device (such as a PBX device 54 or a PSTN device 68) to initiate a telephone call with the device. Alternatively, a gateway device 24 may communicate one or more digits to a call manager 26 identifying an IP telephony device 22 with which a non-IP telephony device 54, 68 desires to communicate.

Digit inputs received by a call manager 26 are communicated to digit analysis module 104. Digit analysis module 104 may receive these digits directly from a device process 108, a call control module 102 (which received the digits from a device process 108) or any other suitable process in the same or a different call manager 26. Digit analysis module 104 translates the digit input it receives into the PID of the device process 108 that is associated with the device 22, 24 designated by the received digits. Digit analysis module 104 performs this translation using a table look-up in registration information table 110 or any other suitable process of determining the PID associated with the digits. The digits may be an internal telephone number (such a four-digit extension number), in which case the PID typically identifies a device process 108 associated with a telephony device 22. Alternatively, these digits may be an external telephone number (for example, a seven or ten digit North American Numbering Plan number or a PBX extension), in which case the PID may identify a device process 108 associated with a gateway device 24 or a process associated with a plurality of gateway devices 24. Digit analysis module 104 communicates the PID to the process that requested the digit analysis.

As an example, and not by way of limitation, assume that telephony device 22*a* communicates a call request including a digit string to device process 108*a*. The digit string is a telephone number of telephony device 22*h*. Device process 108*a* receives the digit string and communicates the digits to call control module 102. Call control module 102 communicates the digits to digit analysis module 104 to determine the PID of the device process 108 associated with the digits. Digit analysis module 104 performs a table look-up or any other suitable process of determining the PID associated with the digits (the PID of device process 108*c*) and communicates the PID to call control module 102. Call control module 102 may then communicate with device process 108*c* to initiate a call or other communication between telephony devices 22*a* and 22*h*, as is described below in further detail.

In the example above, the requested communication was between two telephony devices 22*a* and 22*h* controlled by call manager 26*a*. However, in many cases, devices 22, 24 controlled by different call managers 26 may wish to communicate. For example, due to the distributed nature of call managers 26 and the devices 22, 24 that they control, it is quite possible that two devices 22,24 operated by a business may be controlled by two different call managers 26 located across the country from one another. Therefore, the registration information table 110 in a call manager 26 should have not only the PIDs (or other appropriate registration information) of the device processes 108 associated with the devices 22, 24 that the call manager 26 controls (local devices), but also the PIDs of device processes 108 associated with devices 22, 24 controlled by other call managers 26 (remote devices) with which communication might be desired.

As devices 22, 24 come on-line, go off-line or switch call managers 26, the registration table 110 in each call manager 26 needs to be updated. For this reason, each call manager 26 periodically communicates the telephone numbers and associated PIDs of the devices 22, 24 it controls to each of the other call managers 26. Each call manager 26 adds this information to the local device registration information in its registration information table 110.

FIG. 3 illustrates an exemplary registration information table 110 maintained by call manager 26*a*. Table 110 contains a list of digit strings 112 in a left column and a list of respective PIDs 114 of device processes 108 in a right column. In the illustrated embodiment, digit strings 112 include both internal four-digit telephone numbers and external telephone numbers (for example, telephone numbers associated with telephony devices 54, 68). The external telephone numbers are designated in table 110 by the notation "9@" (indicating the number nine preceding any digit string). These external telephone numbers could also include any other appropriate format (for example, external calls could be designated as "xxx-xxxx", "xxx-xxx-xxxx", "1-xxx-xxx-xxxx", or any other appropriate telephone number pattern which includes wildcards). For the purposes of this description, the term "telephone number" will be used to refer to specific telephone numbers (which include no wildcards) as well as telephone number patterns in which one or more digits are represented by a wildcard, such as "x".

In the illustrated embodiment, each PID 114 includes a node number (representing a call manager 26), a process name (identifying the type of process), and an instance number. For example, the PID '1.dp.3' may indicate the third device process 108 executed by the call manager 26 having a node number of '1'. Similarly, the PID '2.dp.1' indicates the first device process 108 executed by a second call manager having 26 a node number of '2'. Although a particular type of PID 114 is illustrated, any other method of identifying a device process 108 in a call manager 26 may be used. In addition, other appropriate processes associated with devices 22, 24 may also be identified in registration information table 110.

A PID 114 enables a call control module 102 (or another appropriate process) in one call manager 26 to directly communicate with a device process 108 in the same (local) call manager 26 or another (remote) call manager 26 in order to establish communication between two devices 22, 24. Registration information table 110 may contain the PIDs of many different types of processes executing at multiple call managers. This PID information provides a location or address at which a process may be signaled, even if that process is at a different call manager than the process or other component that is sending the signal. As will be described below, using registration information table 110, a telephone number received from a device 22, 24 may be resolved at the call manager 26 receiving the telephone number into a PID of a device process 108 (or other type of process) associated with a device 22, 24 identified by the telephone number. The device process 108 may then be directly signaled even though it may be executing at another call manager.

However, if direct signaling to a remote device process 108 is not available, PIDs 114 of remote device processes 108 may be replaced with just the node number of the remote call manager 26 executing the remote device process 108. In this case, call control module 102 (or another appropriate process) signals the remote call manager 26 with the telephone number of the device 22, 24 with which communication is desired. The call manager receiving the signaling then communicates the telephone number to its local digit analysis module 104, which determines the appropriate local PID. The local digit analysis module 104 communicates the PID to the local call control module 102, which then initiates (or attempts to initiate) the desired communication between devices 22, 24.

To keep the registration information table 110 at each call manager 26 updated, each call manager 26 may dynamically disseminate appropriate registration information associated with devices 22, 24 over which it has control. In addition, call managers 26 may monitor the status of other call managers 26 to determine whether to update or disseminate device registration information. In one embodiment, call managers 26 perform this dissemination and updating of registration information according to a set of four procedures, illustrated in FIGS. 4A-4D. These procedures provide for the updating of the information in the registration information table 110 of each call manager 26 each time a device 22, 24 or call manager 26 comes on-line or goes off-line.

Figure 4A:
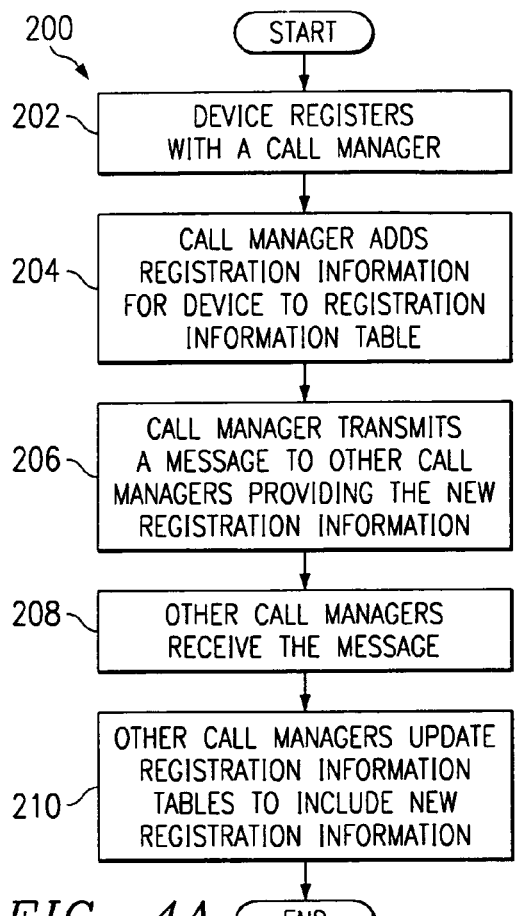
FIGS. 4A-4D illustrate exemplary procedures for updating registration information stored in a registration information table in accordance with one embodiment of the present invention.

FIG. 4A illustrates a first procedure 200 for updating registration information. Procedure 200 begins when device 22, 24 registers with and comes under the control of a call manager 26 at step 202. This includes a receipt of registration information from the device 22, 24 and the creation of a device process 108 associated with the registering device 22, 24. The controlling call manager 26 adds the appropriate registration information (for example, the device's telephone number and the PID of the associated device process 108) to its registration information table 110 at step 204 and communicates a message to all other active call managers 26 providing the registration information at step 206. The other call managers 26 receive this message at step 208, and each call manager 26 updates its registration information table 110 to include the new registration information at step 210. This dissemination of information according to procedure 200, as well as the three other procedures described below, may be made directly between digit analysis modules 104 of the active call managers 26.

Figure 4B:
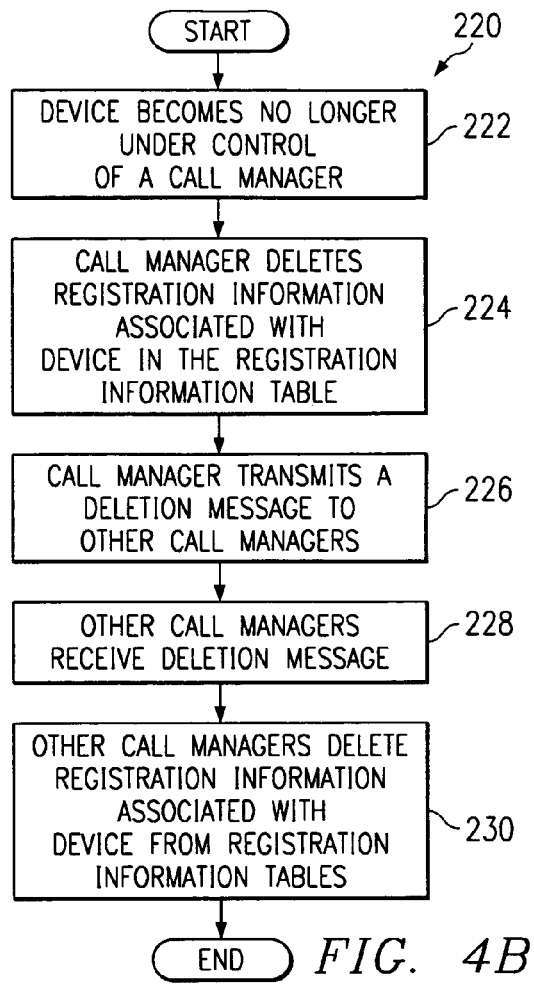

FIG. 4B illustrates a second procedure 220 for updating registration information. Procedure 220 begins at step 222 when a device 22, 24 fails, is disconnected from communication network 10, unregisters with its controlling call manager 26, or is otherwise no longer under the control of a previously controlling call manager 26. The call manager 26 deletes the registration information associated with the device 22, 24 from its registration information table 110 at step 224 and communicates a deletion message to all other active call managers 26 indicating that the information has been deleted at step 226. The other call managers 26 receive this message at step 228 and delete the registration information associated with the device 22, 24 from their registration information table 110 at step 230. The deletion message sent when a device 22, 24 is no longer controlled by a particular call manager 26 and the registration information sent when a device registers (becomes under control) of a particular call manager 26 may both be generalized as types of status information sent by a call manager 26 when the call manager 26 becomes aware of a change in the control status of a device 22, 24.

A controlling call manager 26 may periodically poll the devices 22, 24 that it controls by sending out a polling message to determine when a device 22, 24 has failed, been disconnected from communication network 10, or is otherwise no longer able to be controlled by the call manager 26. If call manager 26 fails to receive a response to a polling message from a device 22, 24, call manager 26 determines that the non-responding device 22, 24 is no longer under its control. Alternatively, call manager 26 may expect a regular "heartbeat" from each device 22, 24 registers with call manager 26. If a registered device 22, 24 does not send a heartbeat, call manager 26 determines that the device 22, 24 is no longer under its control.

Figure 4C:
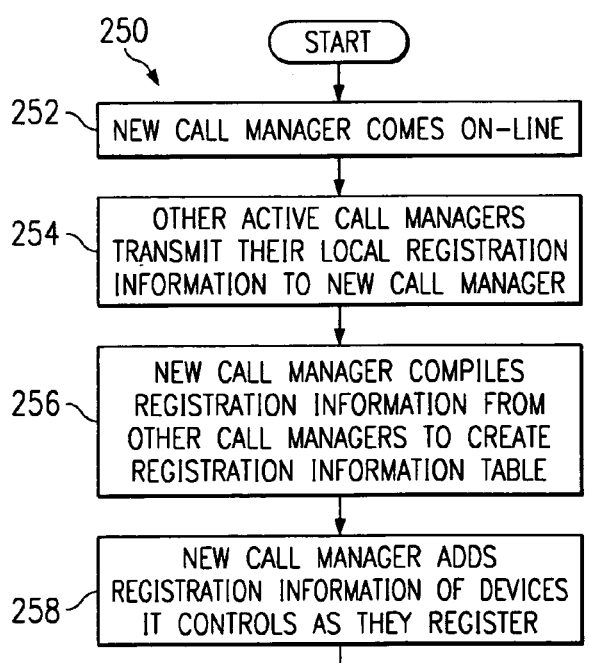

FIG. 4C illustrates a third procedure 250 for replicating registration information. Procedure 250 begins when a new call manager 26 is connected to communication network 10 and comes on-line at step 252. When the new call manager 26 is detected, the other active call managers 26 communicate their local registration information (the information associated with the devices 22, 24 that a call manager 26 controls) to the new call manager 26 at step 254. Call managers 26 may detect the presence of a new call manager 26 in communication network 10 by periodically communicating polling messages over communication network 10 and determining whether a new call manager 26 has responded. The new call manager 26 compiles the registration information sent by the other call managers 26 to create its own registration information table 110 at step 256. As devices 22, 24 register with the new call manager 26, the new call manager 26 adds local registration information to the remote registration information received from the other call managers 26 at step 258.

The combination of the local and remote registration information may be referred to as composite registration information. This composite registration is stored in registration information table 110. The registration information table 110 of a call manager 26 may include one or more flags indicating which entries in that particular registration information table 110 comprise local registration information, so that the call manager 26 storing the registration information table 110 will know which entries to replicate to new call managers 26. Alternatively, a call manager 26 may determine which entries comprise local registration information based on the node number or PID included in the entry.

Figure 4D:
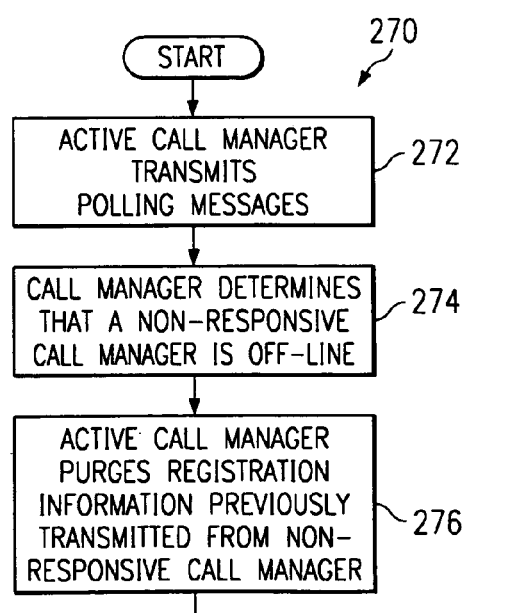

FIG. 4D illustrates a fourth procedure 270 for replicating registration information when a call manager 26 has gone off-line (for example, when it has failed, is disconnected from communication network 10, or is unable to communicate with one or more of the other active call managers 26). Procedure 270 begins with each active call manager 26 communicating polling messages to each of the other active call managers 26 at step 272. A call manager 26 determines that a previously active call manager 26 (for example, a call manager 26 that previously responded to polling messages) has gone off-line at step 274 when the previously active call manager 26 fails to respond to the polling message. The active call manager 26 purges the registration information stored in its registration information table 110 that was previously communicated by the non-responsive call manager 26 (the non-responsive call manager's local registration information) at step 276. A similar process is performed by all other active call managers 26.

Although slow data transmission rates or other communication problems affecting the replication and updating procedures described above may cause inconsistencies between the registration information tables 110 of the active call managers 26, these inconsistencies are resolved over time without having a detrimental effect on the operation of call managers 26 and their control of devices 22, 24. As an example, assume that telephony device 22a, which is controlled by call manager 26a and has a telephone number or extension of '1000', is unable to communicate with call manager 26a due to a network failure. When call manager 26a fails to receive a polling response from telephony device 22a, call manager 26a deletes the registration information associated with telephony device 22a from its registration information table 110. Call manager 26a communicates a message to all active call managers 26 indicating that the information has been deleted according to procedure 220.

However, due to slow data transmission rates in portions of communication network 10, telephony device 22a is able to reregister with a call manager 26c as extension '1000' before the deletion message from call manager 26a reaches call manager 26c. Call manager 26c registers telephony device 22a and changes the PID that was associated with extension '1000' in its registration information table 110 from a remote PID (located at call manager 26a) to a local PID of a device process 108 that was created for telephony device 22. Call manager 26c communicates a message to all active call managers 26 providing the registration information according to procedure 200. When call manager 26c receives the deletion message from call manager 26a, call manager 26c ignores the deletion message since it no longer associates extension '1000' with a device process 108 at call manager 26a.

Alternatively, call manager 26c may not initially change the PID associated with extension '1000' when telephony device 22a registers with call manager 26c. Instead, call manager 26c may create a second entry associated with extension '1000'. The multiple entries are then resolved as described below in relation to call manager 26b.

In this example, a third call manager 26b is also active in communication network 10. Call manager 26b receives the registration message from call manager 26c before it receives the deletion message from call manager 26a. Call manager 26b adds the new registration information for extension '1000' in its registration information table accordingly. However, it does not remove the entry for extension '1000' associated with call manager 26a, since it has received conflicting information regarding the PID to be associated with extension '1000'. Typically, call manager 26b will eventually receive the deletion message from call manager 26a, and call manager 26b will then delete the extension '1000' entry associated with call manager 26a. However, if this deletion message is not received due to some type of network failure, the next time call manager 26b attempts to signal the device process 108 of call manager 26a associated with extension '1000', call manager 26a will inform call manager 26b that it no longer controls telephony device 22a. Call manager 26b then deletes the extension '1000' entry associated with call manager 26a in its registration information table 110. Therefore, the registration information tables 110 of call managers 26 eventually become consistent, and there is no disruption in performance during the interim.

Due in part to the digit analysis replication scheme described above, a dynamic, flexible, scalable and reliable IP telephony network is created in which the task of controlling a number of devices 22, 24 can be distributed seamlessly and dynamically between a number of call managers 26. A call manager 26 can control any device 22, 24 coupled to communication network 10 regardless of the respective geographic locations of the call manager 26 and the devices 22, 24. Therefore, in the event that a call manager 26 experiences communication problems, goes off-line, or reaches its device control capacity, the control of devices 22, 24 can be automatically distributed to other call managers 26, regardless of their physical location. Furthermore, the distribution of device control between call managers 26 can be dynamically changed without the intervention of a human administrator.

Figure 5:
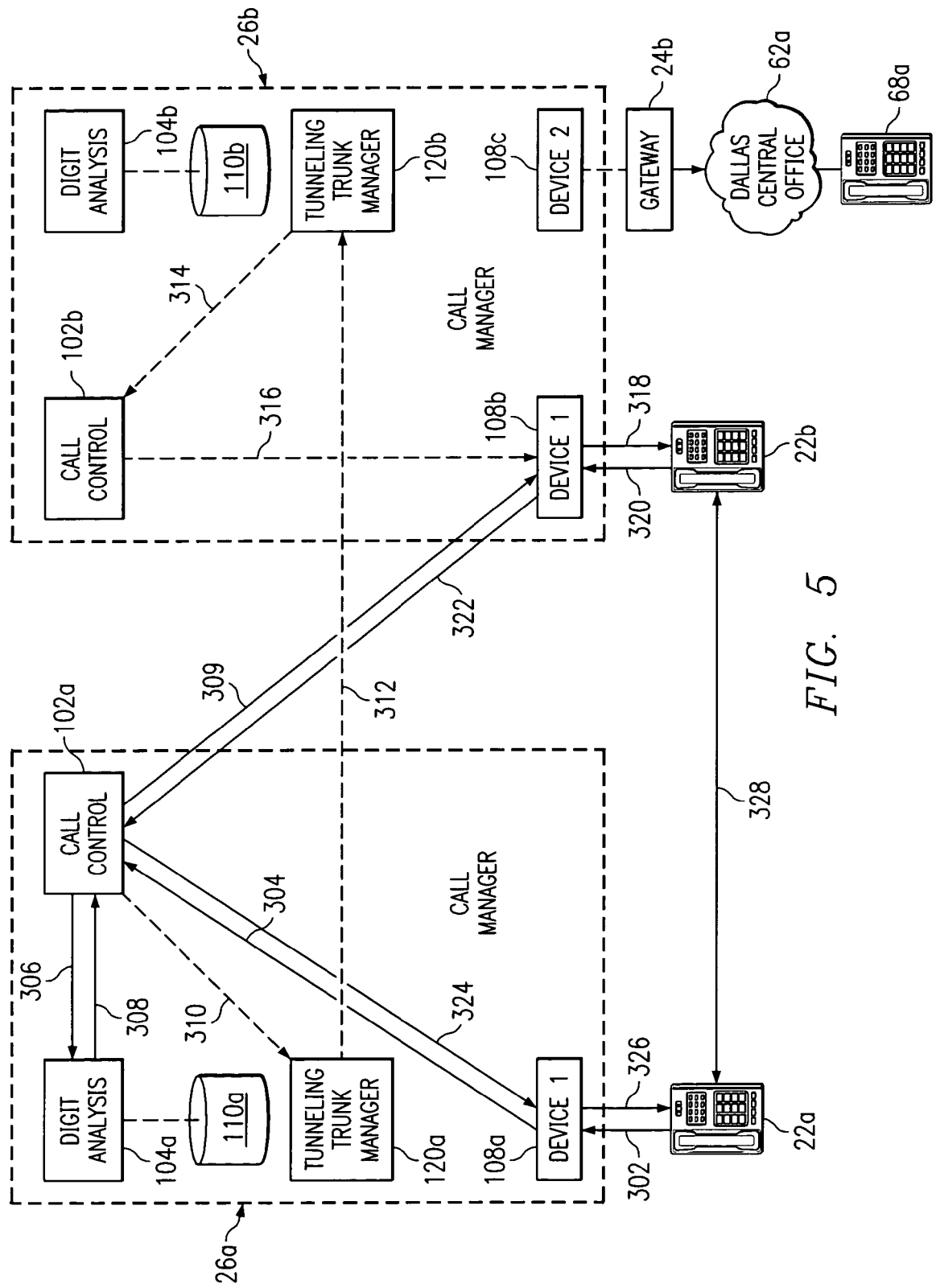
FIG. 5 illustrates an exemplary call routing process between call managers coupled to the communication network.

FIG. 5 illustrates an exemplary call routing process between call managers 26a and 26b in communication network 10. Although FIG. 5 illustrates call managers 26a and 26b and certain devices 22, 24 controlled by call managers 26a and 26b, it should be understood that this description applies to call routing between any devices 22, 24 controlled by any call manager(s) 26 in communication network 10. Furthermore, although FIG. 5 illustrates a series of communications between different modules or processes in call managers 26a and 26b, other appropriate intermediary modules or processes may be involved in these communications, and the functions of one or more of the described modules or processes may be divided between multiple components or combined in a single component.

When a user wishes to place a call from IP telephony device 22a to IP telephony device 22b in communications network 10, the calling telephony device 22a communicates a call request signal to its associated device process 108a executed by call manager 26a, as indicated by arrow 302. The call request signal indicates the telephone number of called telephony device 22b. Device process 108a communicates the call request to call control module 102a as indicated by arrow 304, and call control module 102a communicates the telephone number of called telephony device 22b to digit analysis module 104a as indicated by arrow 306. Call control module 102a may communicate the telephone number as a whole or it may communicate each digit of the telephone number successively. Digit analysis module 104a obtains device location information from registration information table 110a, and communicates this location information to call control module 102a, as indicated by arrow 308.

The type of location information that digit analysis module 104a communicates to call control module 102a depends on the signaling method used to communicate with device processes 108. As discussed above, if direct signaling between call control module 102a and device process 108b is used, then registration information table 110a includes a PID for device process 108b. In this case, digit analysis module 104a determines the PID associated with the telephone number in registration information table 110a (the PID of device process 108b) and communicates the PID to call control module 102a. Call control module 102a directly signals device process 108b with the call request (for example, using an SDL link), as indicated by arrow 309.

Alternatively, call control process 102a may communicate with call control process 102b using a tunneling trunk instead of communicating directly to device process 108b. This tunneling trunk may be, but is not limited to, a Transmission Control Protocol (TCP) or a User Datagram Protocol (UDP) connection between call manager 26a and call manager 26b. If a tunneling trunk is used, registration information table 110a associates the node number of call manager 26b (which may be included in a PID of device process 108b) with the telephone number of telephony device 22b. Digit analysis module 104a communicates the node number or complete PID to call control module 102a. As indicated by arrow 310, call control module 102a communicates the call request (including the node number or PID) to a tunneling trunk manager 120a that controls communication over the tunneling trunks connecting call manager 26a to the other call managers 26. Arrow 310 is dashed to indicate that the use of tunneling trunks is an alternative to direct signaling.

If the node number or PID indicates that the called device is controlled by call manager 26a (which is not the case in the illustrated embodiment), tunneling trunk manager 120 would return the call request to call control module 102a. Call control module 102a would signal the device process 108 associated with called telephony device 22b to indicate the call request from calling telephony device 22a.

If, as illustrated, the node number or PID indicates that called device 22b is remote from call manager 26a and controlled by call manager 26b, tunneling trunk manager 120a communicates the call request to a tunneling trunk manager 120b using a tunneling trunk set up between call managers 26a and 26b, as indicated by arrow 312. Tunneling trunk manager 120b communicates the call request to call control module 102b, as indicated by arrow 314. If a PID was communicated from call manager 26a (and thus the telephone number was resolved into the address of a device process 108 at call manager 26a), the PID is communicated to call control module 102b and the telephone number of telephony device 22b need not be sent from call manager 26a. Alternatively, if only a node number was communicated from call manager 26a, then call control module 102a may instruct tunneling trunk manager 120a to also send the telephone number of telephony device 22b to identify the telephony device 22 being called.

When call control module 102b receives the call request, call control module 102b either directly communicates with device process 108b based on a PID sent from call control module 102a, or call control module 102b communicates a telephone number sent by call manager 26a to digit analysis module 104*b*, which then returns the PID of device process 108*b*. Call control module 102*b* signals device process 108*b* to indicate the call request from calling telephony device 22*a*, as indicated by arrow 316.

Having received a call request signal from either call control module 102*a* or 102*b* (or from any other appropriate source) using either direct signaling or a tunneling trunk (or any other appropriate signaling method), device process 108*b* communicates the call request to called telephony device 22*b*, as indicated by arrow 318. If called telephony device 22*b* is available to communicate with calling telephony device 22*a*, called telephony device 22*b* communicates a call proceed signal to device process 108*b*, as indicated by arrow 320. The call proceed signal may be any appropriate communication that indicates a device's availability or desire to proceed with a communication. Device process 108*b* then communicates the call proceed signal to call control module 102*a*. Device process 108*b* may communicate this signal directly to call control module 102*a* using a direct signaling link, as indicated by arrow 322, or device process 108*b* may first communicate the signal to call control module 102*b*, which then communicates the signal to call control module 102*a* using the tunneling trunk, as described above.

Call control module 102*a* sets up the call by communicating the call proceed signal to device process 108*a*, as indicated by arrow 324. Device process 108*a* signals calling telephony device 22*a*, as indicated by arrow 326, and instructs telephony device 22*a* to establish media (audio and/or video) streaming with called telephony device 22*b* over a UDP connection, or any other suitable connection for transmitting media. A media streaming connection 328 may be directly between telephony devices 22*a* and 22*b*.

When media streaming connection 328 is established, the users of telephony devices 22*a* and 22*b* may begin to communicate. A codec (coder/decoder) in telephony devices 22*a* and 22*b* converts the media (for example, voice, video or fax) signals generated by the users of telephony devices 22*a* and 22*b* from analog signals into digitally encoded data. The codec may be implemented either in software or as special-purpose hardware in IP telephony devices 22*a* and 22*b*.

The digitally encoded data is encapsulated into IP packets so that it can be transmitted between telephony devices 22*a* and 22*b*. The encapsulation may be performed using Real-Time Transport Protocol (RTP) running over UDP, or any other suitable communication protocol. Once UDP has received and reassembled the IP packets at the destination telephony device 22, a codec in the destination telephony device 22 translates the digital data into analog audio and/or video signals for presentation to the user. The entire process is repeated each time that any call participant (or any other source) generates a media signal.

In addition to calls between IP telephony devices 22, calls can also be placed to and received from non-IP telephony devices 54, 68 that are connected to PBX 50, PSTN 60, or any other appropriate external network. Gateways 24 couple telephony devices 54, 68 to LANs 20 and convert analog or digital circuit-switched data transmitted from PBX 50 or PSTN 60 to packetized data transmitted by LANs 20, and vice-versa.

When a user of an IP telephony device 22*a* desires to place a call to an external telephony device, such as a PBX telephony device 54 or a PSTN telephony device 68, from IP telephony device 22*a*, calling telephony device 22*a* communicates a call request signal to its associated device process 108*a*. The call request signal indicates the telephone number of the called telephony device, for example PSTN telephony device 68*a*. As described above, device process 108*a* communicates the call request to call control module 102*a*, and call control module 102*a* communicates the telephone number of telephony device 68*a* to digit analysis module 104*a*.

Digit analysis module 104*a* communicates location information associated with the telephone number in registration information table 110*a* to call control module 102*a*. Since telephony device 68*a* is not an IP telephony device 22 controlled by a call manager 26, its telephone number (including a telephone number pattern representing its telephone number, such as 'xxx-xxx-xxxx') may be associated in registration information table 110*a* with a process controlling one or more gateway devices 24 that provide access to PSTN 60. For example, the telephone number '214-xxx-xxxx' (214 being an area code in Dallas) may be associated with the PID or node number of a device process 108*c* controlling gateway 24*b*. Gateway 24*b* provides access to Dallas central office 62*a* (to which telephony device 68*a* is coupled). Alternatively, the telephone number may be associated with a route list control process that controls multiple gateway devices 24 by acting as an intermediary between a call control module 102 and the device processes 108 controlling each gateway device 24.

Assuming the telephone number or extension indicated in the call request from telephony device 22*a* is directly associated with device process 108*c* controlling gateway 24*b* (for example, there is no intermediate route list control process), the PID (or associated node number) of device process 108*c* is communicated from digit analysis module 104*a* to call control module 102*a*. Call control module 102*a* signals device process 108*c* using direct signaling, a tunneling trunk, or any other appropriate signaling method to indicate the call request and the telephone number of telephony device 68*a*. Process 108*c* communicates with gateway 24*b*, and gateway 24*b* interfaces with central office 62*a* to determine whether telephony device 68*a* can accept the call. If telephony device can accept the call, gateway 24*b* communicates a call proceed signal (through device process 108*c*) to device process 108*a* using direct signaling, a tunneling trunk, or any other appropriate signaling method. Telephony device 22*a* establishes a media streaming connection with gateway device 24*b* using UDP/IP or any other appropriate method.

As described above, a codec in telephony device 22*a* converts the media signals generated by the user of telephony device 22*a* from analog signals into digital encoded data. The digitally encoded data is encapsulated into IP packets. The IP packets are communicated to gateway device 24*b* and gateway device 24*b* converts the digital data to the analog or digital format used by the PSTN trunk to which gateway device 24*b* is coupled. Gateway device 24*b* signals central office 62*a* to direct the media from telephony device 22*a* to telephony device 68*a*. For media transmissions from PSTN telephony device 68*a* to IP telephony device 22*a*, the process is reversed. Gateway device 24*b* receives the incoming media transmissions (in either analog or digital form) and converts them into the digital format used for communications over LAN 20*a*. The digital data is then encapsulated into IP packets and transmitted over LAN 20*a* to IP telephony device 22*a*.

A similar process to that described above is used when a call is placed from PSTN telephony device 68*a* (or any other non-IP telephony device) to IP telephony device 22*a*. In this case, a user of telephony device 68*a* dials a telephone number that is associated in central office 62*a* with gateway device 24*b*. For example, the telephone number '214-555-xxxx' may be associated with gateway 24*b* (where 'xxxx' represents the extensions of one or more IP telephony devices 22). If telephony device 68*a* dials '214-555-1001', then central office 62*a* connects telephony device 68*a* with gateway 24*b*. Gateway 24*b* communicates the call request (including the telephone number dialed by the user of telephony device 68*a*, which gateway device 24*b* may or may not truncate to leave only the last four digits) to its device process 108*c*.

Device process 108*c* communicates the call request to call control module 102*b*, and call control module 102*b* communicates the telephone number to digit analysis module 104*b*. Digit analysis module 104*b* communicates location information for device process 108*a* that is associated with the telephone number to call control module 102*b*. Call control module 102*b* communicates the call request to device process 108*a* (through direct signaling, a tunneling trunk, or any other appropriate method), and device process 108*a* communicates the call request to telephony device 22*a*. If telephony device 22*a* accepts the call by sending a call proceed signal, media streaming is set up between telephony device 22*a* and gateway device 24*b*, and the call proceeds as described above (with gateway device 24*b* acting as an intermediary between telephony devices 22*a* and 68*a*).

FIGS. 6A and 6B illustrate exemplary route lists 122 and route groups 124, respectively, for use in routing calls to gateway devices 24. As mentioned above, instead of being directly associated with a device process 108 controlling a gateway device 24, a telephone number may be associated in registration information table 110 with a route list control process providing access to one or more gateway devices 24. Each route list control process has an associated route list 122 that contains an ordered list of one or more route groups 124. For example, route list 122*a* includes route groups 124*a*, 124*c*, and 124*b*, in the order listed. A route group 124 includes an ordered list of one or more device name/port number pairs 126 associated with one or more gateway devices 24. For example, route group 124*a* includes Port1, Port2 and Port3 of Gateway1, and Port1, Port2 and Port3 of Gateway2. The ports of a gateway device 24 are the individually addressable physical, logical or virtual resources, such as trunk lines or logical channels, over which a call may be placed to a non-IP telephony device 54, 68. An individual port may be capable of handling multiple calls.

As will be described in further detail below, when a telephone number is dialed that is associated with a route list control process in registration information table 110, the call request is sent to the route list control process. The route list control process offers the call to the ports of the gateway devices 24 listed in the first route group 124 of the route list 22 associated with the route list control process, for example, route group 124*a* of route list 124*a*. The call is offered to these ports in the order in which the associated port numbers are listed in the route group 124*a*. The route list control process communicates the call request to each gateway device 24 (indicating the requested port) until one of the gateway devices 24 accepts the call. If no port listed in route group 124*a* can accept the call, the route list control process begins offering the call to the ports listed in route group 124*c*, and then to the ports listed in route group 124*b*.

The route lists 122 and accompanying route groups 124 described above are included in a route plan that optimally associates a route list with every type of external number that may be dialed by a user of an IP telephony device 22. For example, the telephone number "214-xxx-xxxx" (a Dallas area code) may be associated with a route list 122 that includes one or more port numbers of gateway 24*b* in the first route group 124. Therefore, no matter where the calling telephony device 22 is located in communication network 10, the call will first be offered to gateway 24*b* (which can place the call directly to Dallas central office 62*a* as a local call without incurring long distance fees). Furthermore, many other factors besides long distance fee savings may also be considered when creating the route plan. Since a route list 122 may apply to many telephony devices 22 (based on the type of external calls made by telephony devices 22), and since those telephony devices 22 may be controlled by multiple call managers 26 in various locations, the route plan is a global plan that is shared between call managers 26.

Figure 7:
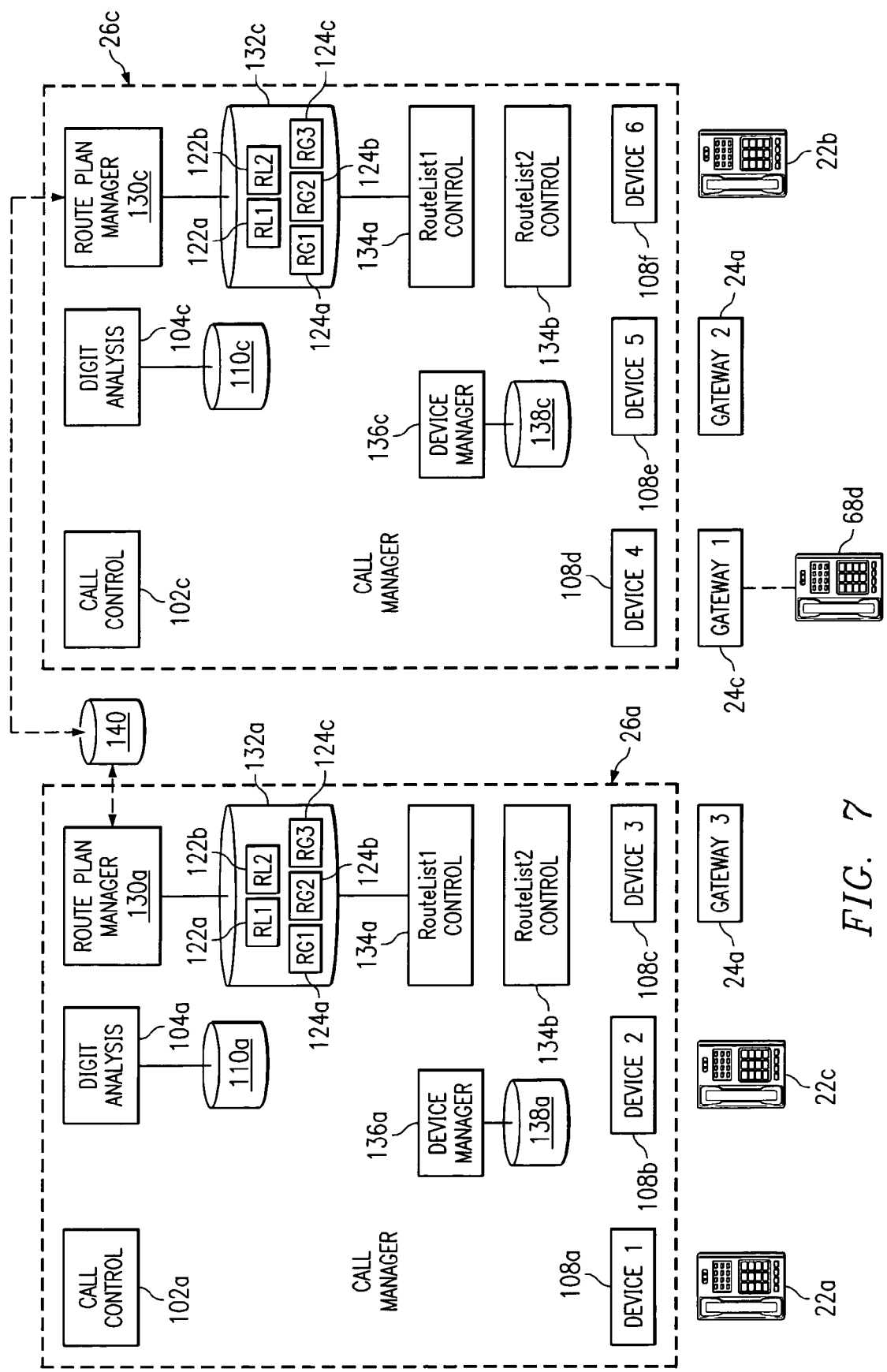
FIG. 7 illustrates exemplary call managers which are operable to route calls according to a global route plan.

FIG. 7 illustrates exemplary call managers 26*a* and 26*c* which are operable to route calls according to a global route plan. Call managers 26 each include a route plan manager 130. Each route plan manager 130 is responsible for downloading and locally storing the global route plan, and for updating the locally stored route plan when there has been a change to the global route plan. The global route plan, including route lists 122 and route groups 124, may be stored in a global route plan database 140 that is accessible from each call manager 26. Each route plan manager 130 downloads the route plan from global route plan database 140 and stores the route plan in a local route plan database 132. Local route plan database 132 may be managed by route plan manager 130 or any other appropriate component of call managers 26. In an alternative embodiment, route plan manager 130 does not download the global route plan database in its entirety. In this embodiment, route plan manager 130 accesses global route plan database 140 as needed to route calls instead of accessing information stored in a local route plan database 132.

Returning to the former embodiment, after downloading the route plan to local route plan database 132, the route plan manager 130 at each call manager 26 determines the route lists 122 included in the global route plan and creates a route list control process 134 for each route list 122. Therefore, each call manager 26 includes the same route list control processes 134. If an exemplary route plan that includes route lists 122*a* and 122*b*, and route groups 124*a*, 124*b*, and 124*c* is assumed, then each route plan manager 130 creates route list control processes 134*a* and 134*b* associated with route lists 122*a* and 122*b*, respectively. If a route list 122 is later added to or deleted from the route plan, then each route plan manager 130 creates a new route list control process 134 or deletes an existing route list control process 134, as appropriate. The method by which route plan managers 130 propagate and receive changes to the route plan is described below.

Each route list control process 134 is an intermediary between call control module 102 and the device process 108 controlling gateway devices 24 included in the associated route list 122. When a route list control process 134 is created, route plan manager 130 instructs the route list control process 134 to register with call control module 102. Route list control process 134 communicates a signal to call control process 102 indicating its PID and the telephone numbers to be associated with route list control process 134 in registration information table 110 according to the route plan. Call control module 102 communicates this information to digit analysis module 104 for inclusion in registration information table 110. Therefore, in addition to or instead of device process PIDs 114 (illustrated in FIG. 3), registration information table 110 includes route list control process PIDs associated with telephone numbers.

When a call is placed from a telephony device 22, 54, 68, the telephone number associated with the call request is sent to the appropriate digit analysis module 104, as described above. If the called telephony device is a non-IP telephony device 54, 68, the telephone number is typically associated in the route plan with a particular route list 122. Therefore, the telephone number will be associated with a PID of a route list control process 134 in the registration information table 110 of digit analysis module 104. The call request is communicated to the route list control process 134 indicated by the PID. Route list control process 134 accesses its associated route list 122 and route groups 124 in database 132 and determines an ordered list of gateway device names and associated port numbers through which the call may be placed.

As described above, route groups 124 included in the route plan may include any gateway device 24 coupled to communication network 10. Gateway devices 24 may be controlled by different call managers 26, and the call manager 26 controlling a particular gateway device 24 may change over time. Route groups 124 identify a gateway device 24 using the device name of the gateway device 24 in order to avoid having to change the entries associated with the gateway device 24 each time the gateway device 24 comes under the control of a new call manager 26. The device name does not change when the gateway device 24 registers with a new call manager 26. However, to communicate a call request directly to a gateway device 24, route list control process 134 uses the PID of (or other location information associated with) the device process 108 controlling the gateway device 24. Therefore, a device manager 136 executed by each call manager 26 maintains a device name mapping table 138 that associates the device name of each gateway device 24 with the PID of (or other location information associated with) the device process 108 controlling the gateway device 24.

When a gateway device 24 registers with a call manager 26, the device process 108 created to control the gateway device 24 sends a registration signal to device manager 136 indicating the PID of the device process 108 and the device name of the gateway device 24. Device manager 136 receives similar registration signals from other registering gateway devices 24, and device manager 136 maintains a device name mapping table that associates the device name of each gateway device 24 with a PID of the device process 108 controlling each gateway device 24.

When a route list control process 134 selects a device name from an associated route group 124, route list control process 134 communicates the device name to device manager 136. Device manager 136 determines the PID associated with the device name in device name mapping table 138, and communicates the PID to route list control process 134. Route list control process 134 then communicates the call request to the device process 108 indicated by the PID. Alternatively, each route group 124 may include device process PIDs instead of device names. In this alternative embodiment, device manager would not be needed to perform a device name-to-PID look-up, but the PIDs in each route group 124 would need to be updated to reflect changes in the PIDs of the device process 108 controlling a particular gateway device 24.

The device process 108 to which route list control process 134 communicates the call request may be located at a remote call manager 26. Route list control process 134 communicates the call request to device process 108 using direct signaling, a tunneling trunk, or any other appropriate method. If the particular port of the gateway device 24 cannot process the call, route list control process 134 then begins to offer the call to other ports or other gateway devices 24, as indicated by the route list 122 and its associated route groups 124.

To enable the routing of calls between multiple call managers 26 using a route list 122, any changes to the route plan and any changes to a device name mapping table 138 should be replicated between call managers 26. The route plan may be changed by the creation, modification or deletion of a route list 122 or route group 124, or by a modification of the telephone numbers associated with a particular route list 122. As described above, the route plan is stored in global route plan database 140 that is accessible by all call managers 26. When a call manager 26 comes on-line, the route plan manager 130 downloads the current route plan from global route plan database 140 and stores the route plan in local route plan database 132. Thereafter, when a call manager 26 (or any other appropriate device, such as a computer executing route plan management software) creates, modifies or deletes a route list 122 or route group 124, call manager 26 (or the other appropriate device) sends a signal to global route plan database 140 indicating the change to be made. Global route plan database 140 (or a device controlling database 140) updates the route plan data accordingly. Call manager 26 communicates a change notification message to each of the other call managers 26 indicating the name of the route list(s) 122 or route group(s) 124 that has been created, modified or deleted. A change notification message may be communicated directly to the route plan manager 130 of each of the other call managers 26.

If a route plan manager 130 receives a change notification message indicating a modification to a route list 122, route plan manager 130 communicates an unregister signal to the route list control process 134 associated with the route list 122 and deletes the existing route list 122 in local route plan database 132. Route plan manager 130 queries global route plan database 140 for the new route list 122. The new route list 122 is communicated from global route plan database 140 and stored in local route plan database 132. Route plan manager 130 instructs the route control process 134 that was previously instructed to unregister to re-register with call control module 102 (and, if applicable, to inform call control module 102 of any new telephone numbers to be associated in registration information table 110 with route control process 134). A similar process is performed when a route group 124 is changed, however, the route list control processes 134 associated with any route lists 122 containing the route group 124 are not instructed to unregister before the updated route group 124 is downloaded.

A similar process is also performed when a route list 122 or route group 124 is created or deleted. The only difference is that when a route list 122 is created, an associated route list control process 134 should be created at each call manager 26, and when a route list 122 is deleted, the associated route list control process 134 at each call manager 26 should be deleted.

It should be noted that unlike the device registration information associated with telephony devices 22 in registration information table 110 (for example, a telephone number and a device process PID), the registration information associated with route lists in registration information table 110 (for example, a telephone number and a route list control process PID) does not need to be replicated between call managers 26. This is because a route list control process 134 is created for each route list 122 in the route plan at every call manager 26 when the route plan is downloaded or updated by the route plan manager 130 of each call manager 26. Therefore, this information is already replicated in each registration information table 110. A flag may be associated with the route list control process entries in each registration information table 110 to indicate that the entry does not need to be replicated.

In addition to the route plan data, the device name information (device name and associated device process PID) in device name mapping table 138 also should be replicated to all call managers 26 upon the occurrence of certain events. This device name information is updated and replicated between call managers 26 using a process similar to the process described above for updating and replicating device registration information (using procedures 200, 220, 250, 270).

As with procedure 200, when a gateway device 24 registers with a call manager 26, the device name and PID of the device process 108 controlling with the gateway device 24 are communicated to device manager 136 and stored in device name mapping table 138. The call manager 26 with which the gateway device 24 registered then communicates the device name and associated PID to all other call managers 26 coupled to communication network 10.

As with procedure 220, when a gateway device 24 unregisters or is otherwise no longer under the control of a call manager 26, the device manager 136 of the previously controlling call manager 26 deletes the associated device name and PID from its device name mapping table 138 and communicates a deletion message to all other call managers 26 indicating that the device name and associated PID should be deleted from the device name mapping tables 138 of the other call managers 26.

As with procedure 250, when a new call manager 26 comes on-line, all other call managers 26 send the new call manager 26 the device names and associated PIDs for each of the gateway devices 24 that each call manager 26 controls (the local device name information stored at each call manager 26). The new call manager 26 adds the device name information received from the other call managers 26 to its device name mapping table 138, and also adds device name information associated with gateway devices 24 that subsequently register with the new call manager 26. As with process 270, when a call manager 26 goes off-line, all other call managers 26 delete the device name information associated with the gateway devices 24 that were under the control of the off-line call manager.

In the manner described above, the route plan and device name information stored at each call manager 26 is kept updated so that call routing between call managers 26 may be performed according to the route plan. Alternatively, the route plan and device name information may be maintained and updated using any other appropriate method.

Figure 8:
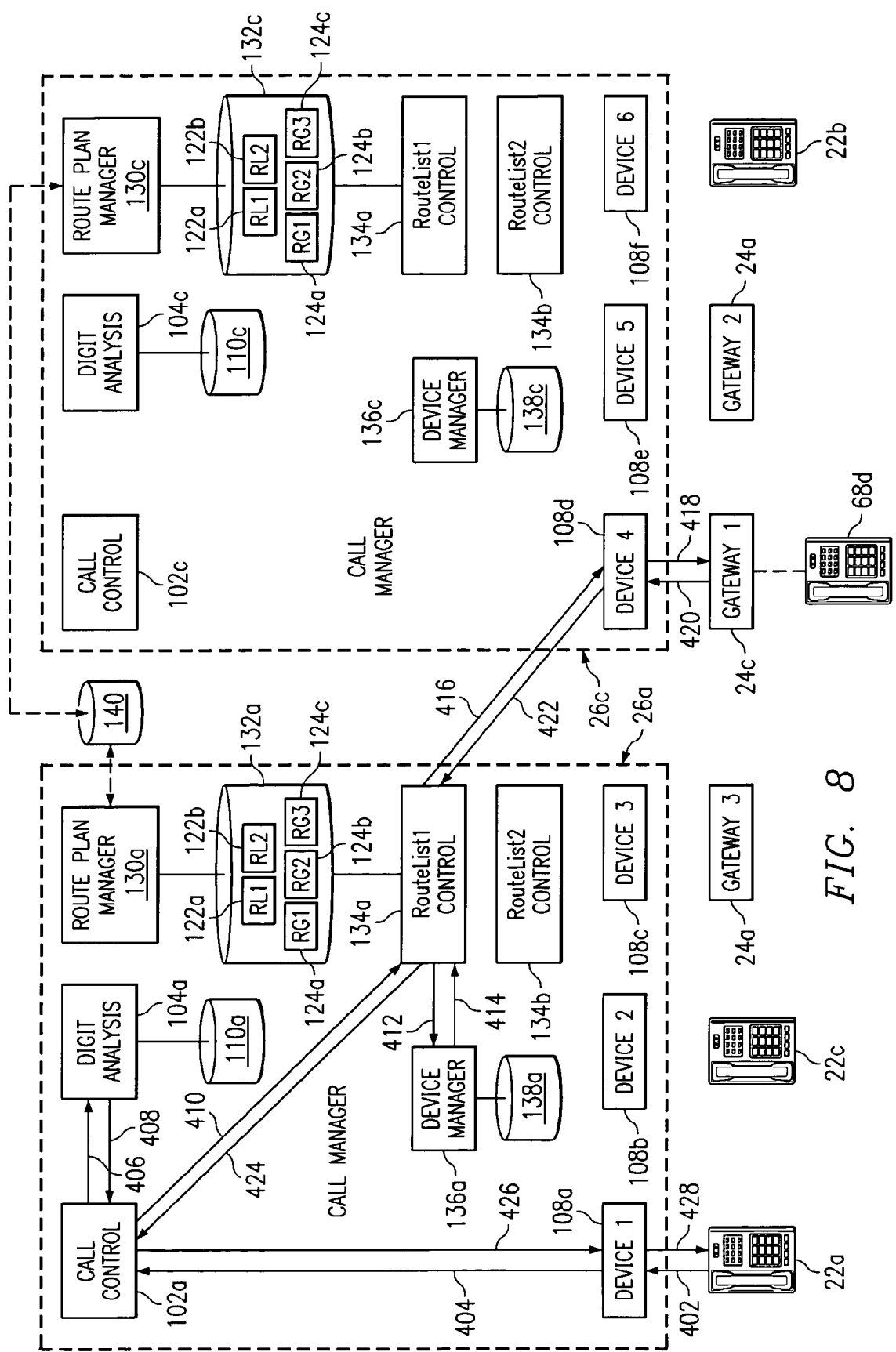
FIG. 8 illustrates an exemplary call routing process between the call managers of FIG. 7.

FIG. 8 illustrates an exemplary call routing process between call managers 26a and 26c using a route plan. In the illustrated embodiment, a user of IP telephony device 22a is attempting to place a call to a user of PSTN telephony device 68d. However, it will be understood that the following description applies equally to calls placed from any telephony device 22, 54, 68 through a gateway 24 to a non-IP telephony device 54, 68. In the illustrated embodiment, telephony device 22a communicates a call request signal (including a telephone number associated with telephony device 68d) to its associated device process 108a as indicated by arrow 402. Device process 108a communicates the call request to call control module 102a, as indicated by arrow 404. Call control module 102a communicates the telephone number included with the call request to digit analysis module 104a, as indicated by arrow 406. Digit analysis module 104a determines a PID associated with the telephone number and communicates this PID to call control module 102a, as indicated by arrow 408.

In the exemplary embodiment, the PID communicated from digit analysis module 104a identifies route list control process 134a associated with route list 122a, illustrated in FIG. 6A. Based on the PID received from digit analysis module 104a, call control module 102a communicates the call request to route list control process 134a, as indicated by arrow 410. Route list control process 134a accesses its associated route list 122a in local route plan database 132a, and obtains the first device name (and associated port number) listed in the first route group 124a of route list 122a. Route list control process 134a communicates the device name to device manager 136a and requests the PID associated with the device name, as indicated by arrow 412. Device manager 136a responds by communicating the PID associated with the device name in device name mapping table 138 to route list control process 134a, as indicated by arrow 414. In the exemplary embodiment, the PID communicated from device manager 136a identifies device process 108d executed by remote call manager 26c. Route list control process 134 communicates the call request and requested port number to device process 108d, as indicated by arrow 416. This communication may be performed directly or indirectly using direct signaling, a tunneling trunk, or any other appropriate signaling method. Device process 108d communicates the call request to gateway 24c, as indicated by arrow 418.

If the requested port of gateway device 24c cannot accept the call request (for example, if it is already handling a maximum number of calls), device process 108d sends a call denial signal to route list control process 134a, and route list control process 134a offers the call request to the device process 108 associated with the next port listed in route group 124a. If no port of a gateway device 24 listed in route group 124a can accept the call, route list control process 134a begins sending the call request to gateway devices 24 and associated ports listed in route group 124c, the next route group 124 listed in route list 122a. This process is continued until the route list is exhausted or until a gateway device 24 accepts the call request. Alternatively, the ports in each route group 124 may be tried in parallel instead of sequentially. In this case, the first port to accept the call may be used to facilitate the call.

If the specified port of gateway 24c can accept the call, gateway 24c communicates the call request to telephony device 68d (for example, through Dallas central office 62a) to determine whether telephony device 68d can accept the call. If telephony device 68d can accept the call, gateway 24c communicates a call proceed signal to device process 108d, as indicated by arrow 420. Device process 108d communicates the call proceed signal to route process 134a, as indicated by arrow 422, and route list control process 134a communicates the call proceed signal to call control module 102a, as indicated by arrow 424. Call control module 102a communicates the call proceed signal to device process 108a, as indicated by arrow 426, and device process 108a communicates the call proceed signal to telephony device 22a, as indicated by arrow 428. As described above, telephony device 22a then establishes media streaming with gateway device 24c to begin communication with telephony device 68d.

As described above, gateway devices 24 may be aggregated in route groups and route lists through the use of route list control processes. In a similar manner, telephony devices 22 may be grouped together by sharing a common telephone number. In the call routing process described above in conjunction with FIG. 5, call requests were routed from a call control module 102 to a device process 108 (using either direct signaling or tunneling trunks) based on a PID or other location information of the device process 108 associated with the called telephone number in registration information table 110. This description assumed that there was only one device process 108 associated with a particular telephone number. However, it may be desirable for multiple telephony devices 22 to share a telephone number.

For example, although the telephony devices 22 associated with an assistant and a manager may be assigned separate telephone numbers, the assistant's telephony device 22 may also be assigned the telephone number of the manager's telephony device 22. Therefore, when a call is placed to the manager's telephony device 22, both the manager's and the assistant's telephony device 22 will ring and be able to answer the call. This may be referred to as a shared line appearance. Since the control of telephony devices 22 may be distributed between multiple call managers 26, telephony devices that share a line appearance may be controlled by different call managers 26. Therefore, a system and method are needed that provide for the sharing of line appearances across call managers 26.

Figure 9:
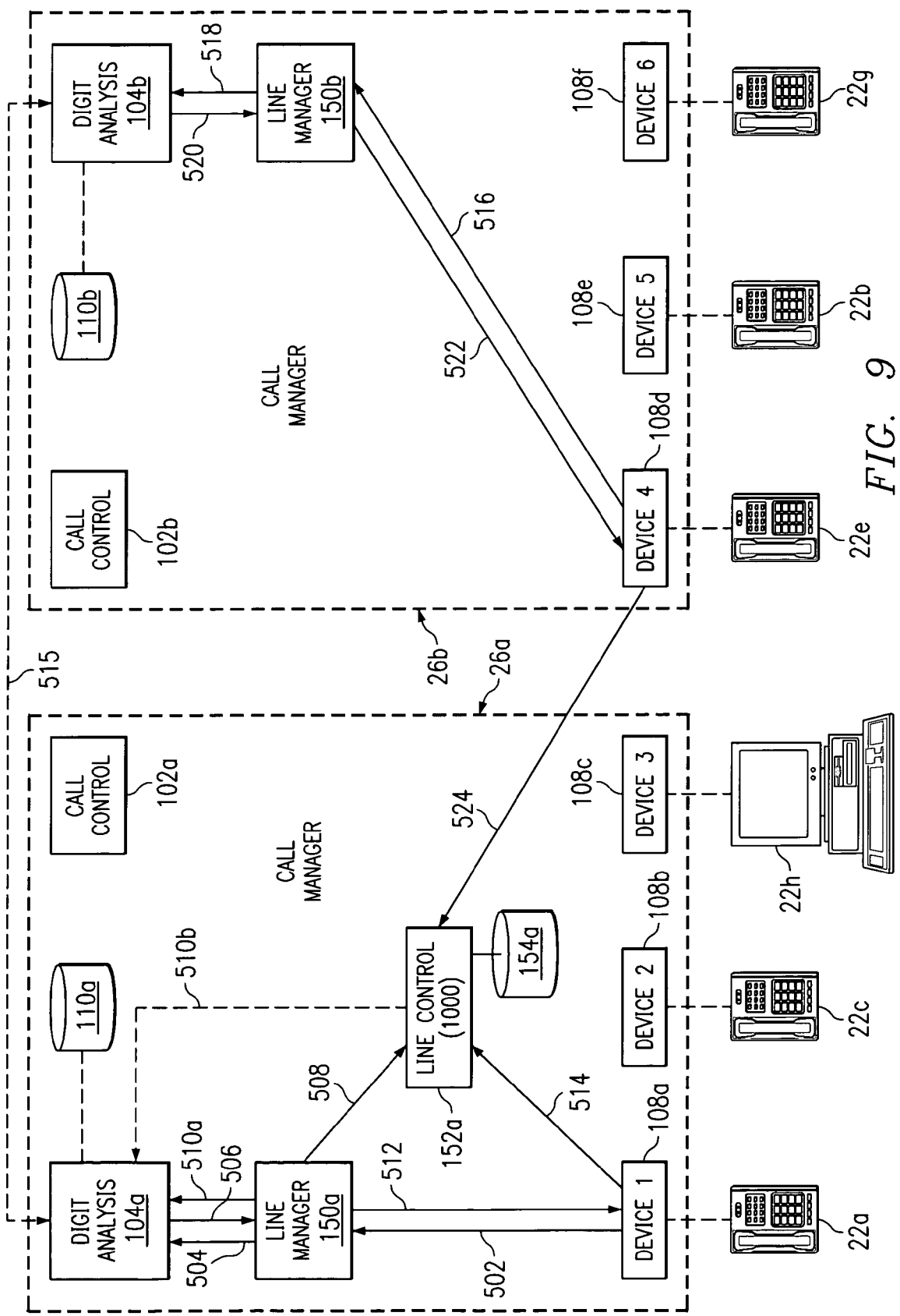
FIG. 9 illustrates a method of creating a line control process and registering telephony devices with the line control process.

FIG. 9 illustrates a method of creating a line control process 152 and registering telephony devices 22 with the line control process 152. After a telephony device 22, such as telephony device 22a, has registered with a call manager 26a and been assigned a device process 108a, telephony device 22a may request that one or more telephone numbers be associated with telephony device 22a as line appearances. Telephony device 22a communicates the requested telephone numbers to its associated device process 108a, and device process 108a communicates a line registration request for each telephone number to a line manager 150a. Line manager 150a is responsible for creating and managing line control processes 152 that manage each line appearance.

As an example, assume that device process 108a sends a single line registration request to line manager 150a requesting a line appearance associated with telephone number '1000', as indicated by arrow 502. When line manager 150a receives the line registration request from device process 108a, line manager 150a communicates the requested telephone number to digit analysis module 104a, as indicated by arrow 504, so that digit analysis module 104a may determine whether a line control process 152 has already been created and associated with telephone number '1000' in registration information table 110a. Assuming that digit analysis module 104a does not find a line control process 152 associated with telephone number '1000' in registration table 110a, digit analysis module 104a signals line manager 150a to indicate that a line control process 152 has not been created for telephone number '1000', as indicated by arrow 506. Line manager 150a sends a command that creates a line control process 152a for telephone number '1000', as indicated by arrow 508. Line manager 150a determines the PID or other location information associated with line control process 152a, and communicates this PID to digit analysis module 104a, as indicated by arrow 510a. Alternatively, line control process 152a may communicate its PID to digit analysis module 104a, as indicated by arrow 510b.

FIG. 10 illustrates a registration information table 110a including line control process PIDs 114. Digit analysis module 104a associates the PID 114 of line control process 152a with telephone number '1000' in registration information table 110a. This association is made in the same manner that telephone numbers were described above as being associated with the PIDs 114 of device processes 108a. A particular telephony device may have a first telephone number 112 that is associated with a line control process PID 114 in registration information table 110a and a second telephone number that is associated with a device process PID 114 in registration information table 110a. Furthermore, one or more device process PIDs 114 in registration information table 110a may be replaced by one or more line control process PIDs 114.

Line manager 150a communicates the PID or other location information associated with line control process 152a to device process 108a, as indicated by arrow 512. Device process 108a communicates a registration request, including the PID of device process 108a, to line control process 152a, as indicated by arrow 514. Line control process 152a stores the PID of device process 108a in a line control database 154a for use when routing calls placed to telephone number '1000,' as described below.

In the illustrated embodiment, a single line control process 152a controls the routing of calls to all telephony devices 22 having a line appearance associated with telephone number '1000'. Therefore, in order for telephony devices controlled by other call managers 26, such as call manager 26b, to register with line control process 152a, the location of line control process 152a should be replicated to all other call managers 26. Since telephone number '1000' is associated with the PID of line control process 152a in registration information table 110a, the replication of the information in registration information table 110a (as described above) provides all other call managers 26 with information about the existence and location of line control process 152a. This replication is indicated by arrow 515. Therefore, when a telephony device 22 controlled by a call manager other than call manager 26a requests a line appearance associated with telephone number '1000', the line manager 150 at the other call manager 26 will not attempt to create a new line control process 152, but will instead instruct the telephony device 22 to register with existing line control process 152a.

For example, assume that telephony device 22e registers with call manager 26b and requests to be registered with telephone number '1000'. Device process 108d controlling telephony device 22e sends a registration request to line manager 150b, as indicated by arrow 516. Line manager 150b communicates the telephone number to digit analysis module 104b, as indicated by arrow 518. Digit analysis module 104b determines whether a PID (or other location information) of a line control process 152 is associated with telephone number '1000' in registration information table 110b. Assuming that digit analysis module 104a has replicated the entry associated with line control process 152a from registration information table 110a, registration information 110b will list the PID of line control process 152a as associated with telephone number '1000'. Digit analysis module 104b determines the PID associated with telephone number '1000' (the PID of line control process 152a), and digit analysis 104b communicates this PID to line manager 150b, as indicated by arrow 520. Line manager 150b communicates the PID to device process 108d, as indicated by arrow 522, and device process 108d communicates a registration request (including the PID of device process 108d) to line control process 152, as indicated by arrow 524. Line control process 152a stores the PID of device process 108d in line control database 154a.

It was assumed in the above example that telephony device 22e requested a line appearance associated with telephone number '1000' after the PID of line control process 152a had been replicated to call manager 26b. However, if telephony device 22e had made this request before such replication (or if communication between call managers 26a and 26b is somehow prevented), then call manager 26b would have created a new line control process 152 for telephone number '1000' since it had no knowledge of a pre-existing line control process 152 for telephone number '1000'. In this case, each call manager 26a, 26b would replicate the entry in registration information table 110 for the local line control process 152 that it created.

Upon receiving a duplicate line control process entry for telephone number '1000', call managers 26 resolve the conflict by deleting the entry associated with the lower-ranked call manager 26. For example, the entry associated with the call manager 26 having the higher node number (or the lower node number) may be deleted. Any other appropriate method of choosing one of the line control processes 152 to be deleted may also be used. In any case, the telephony device(s) 22 registered with the line control process 152 to be deleted are instructed to reregister with the remaining line control process 152.

Figure 11:
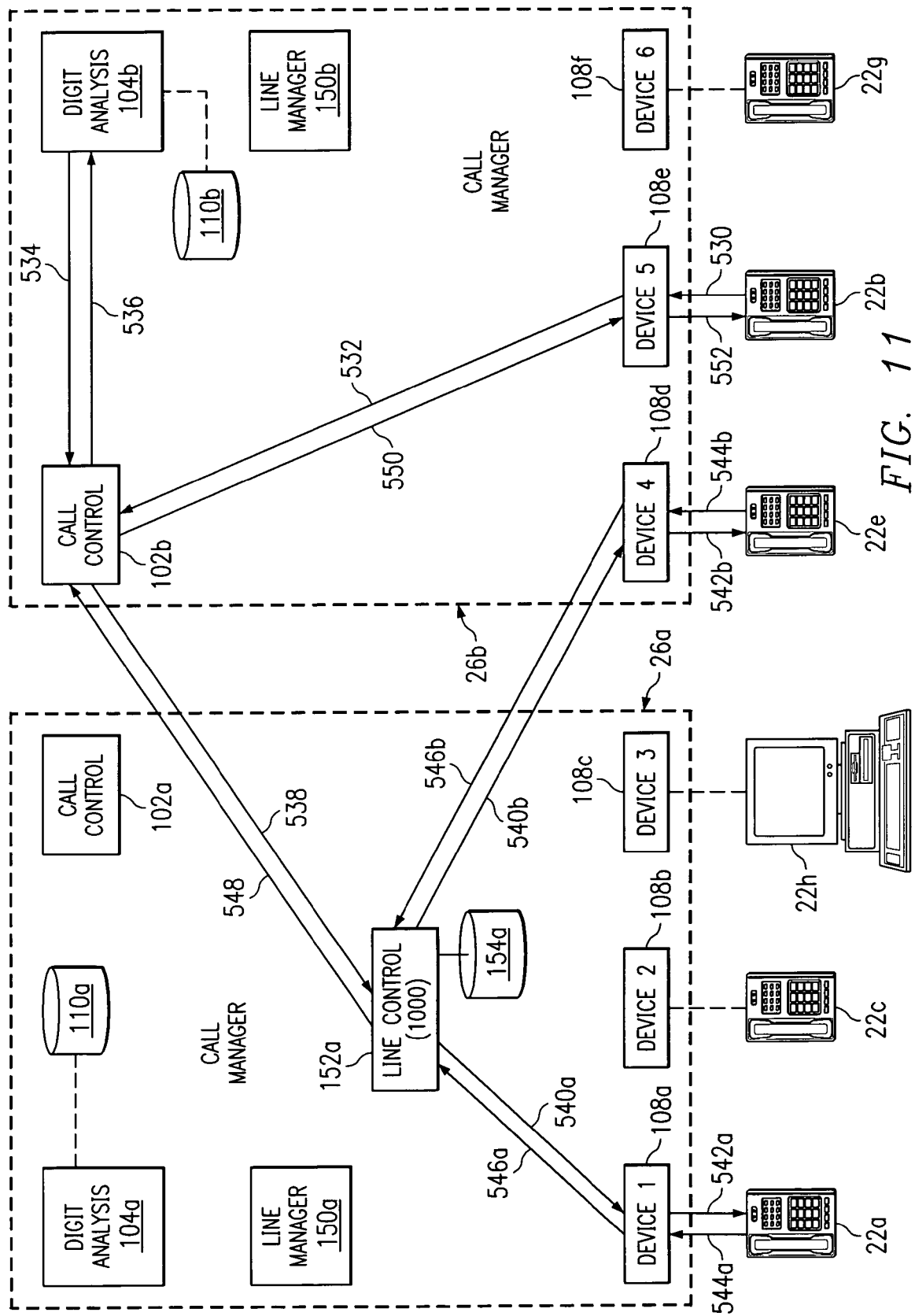
FIG. 11 illustrates an exemplary call routing process between call managers using the line control process of FIG. 9.

FIG. 11 illustrates an exemplary call routing process between call managers 26a and 26b using line control process 152a. Although FIG. 11 illustrates call managers 26a and 26b and certain devices 22, 24 controlled by call managers 26a and 26b, it should be understood that this description applies equally to call routing between any devices 22, 24 controlled by any call manager(s) 26 in communication network 10. Furthermore, although FIG. 11 illustrates a series of communications between different modules or processes in call managers 26a and 26b, other appropriate intermediary modules or processes may be involved in these communications, and the functions of one or more of the described modules or processes may be divided between multiple components or combined in a single component.

When a user wishes to place a call from IP telephony device 22b to telephony devices 22 having a line appearance associated with telephone number '1000', calling telephony device 22b communicates a call request signal (including the called telephone number) to its associated device process 108e executing in call manager 26b, as indicated by arrow 530. Device process 108e communicates the call request to call control module 102b, as indicated by arrow 532, and call control module 102b communicates the called telephone number to digit analysis module 104b, as indicated by arrow 534. Call control module 102b may communicate the telephone number as a whole or it may communicate each digit of the telephone number successively. Digit analysis module 104b obtains the PID (or other location information) of line control process 152a associated with telephone number '1000' in registration information table 110b, and communicates this location information to call control module 102b, as indicated by arrow 536.

The type of location information that digit analysis module 104b communicates to call control module 102b depends on the signaling method used. As described above, if direct signaling is used, then registration information table 110b includes a PID for line control process 152a. If tunneling trunks are used, then registration information table 110 includes an identifier of the node number of call manager 26a (where line control process 152a is executing). For the purposes of this description, it will be assumed that direct signaling is used, however, any other appropriate method of signaling or other communication may also be used. Therefore, digit analysis module 104b communicates the PID of line control process 152a to call control module 102b. Call control module 102b communicates the call request to line control process 152a, as indicated by arrow 538.

When line control process 152a receives the call request, it accesses line control database 154a to determine the PID of each device process 108 that has registered with line control process 152a. Line control process 152a communicates the call request to each of these device processes 108 using the PIDs in line control database 154a. Therefore, line control process 152a communicates the call request to device process 108a, as indicated by arrow 540a, and to device process 108d, as indicated by arrow 540b. Line control process 152a may communicate the call request to each registered device process 108 either substantially simultaneously ("in parallel") or sequentially ("in series"). If sent in series, line control process 152a may wait to receive a response to the call request from a device process 108 before communicating the call request to the next device process 108.

As described above, device processes 108a and 108d communicate the call request to their respective telephony devices 22a and 22e, as indicated by arrows 542. If either called telephony device 22a or 22e is available to communicate with calling telephony device 22b, called telephony device 22a and/or 22e communicates a call proceed signal (indicating that telephony device(s) 22a and/or 22e can accept the call) to its respective device process 108a or 108d, as indicated by arrows 544. Device processes 108a and 108d communicate the call proceed signal to line control process 152a, as indicated by arrows 546. Line control process 152a communicates the call proceed signal(s) to call control module 102b, as indicated by arrow 548. If call requests were communicated to device processes 108a and 108d in parallel, and if telephony devices 22a and 22e both accepted the call, line control process 152a may communicate the call proceed signal from the telephony device 22 that accepted the call first. Alternatively, line control process 152a may communicate both call proceed signals to call control module 102b so that a three-way call may be set-up.

Call control module 102b sets up the call by communicating a call proceed signal to device process 108e, as indicated by arrow 550. Device process 108e signals telephony device 22b, as indicated by arrow 552, and instructs telephony device 22b to establish media streaming with called telephony device(s) 22a and/or 22e to establish the call as described above.

Figure 12:
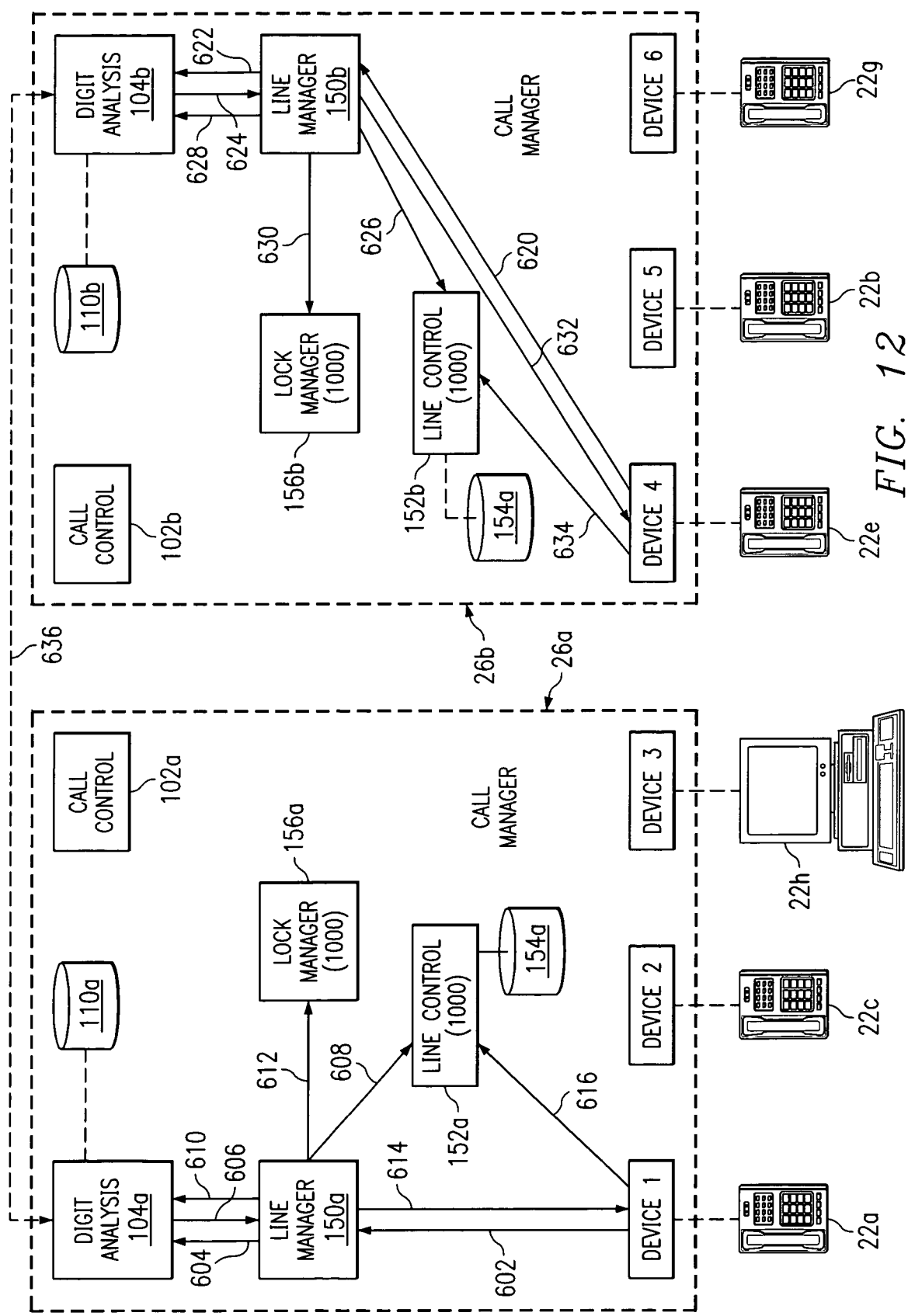
FIG. 12 illustrates an alternative method of creating line control processes and registering telephony devices with the line control processes.

FIG. 12 illustrates an alternative method of creating line control processes 152 and registering telephony devices 22 with the line control processes 152. The method of registering and routing calls described above involved the use of a single line control process 152a to register telephony devices 22 with a particular telephone number and to direct calls to that telephone number. However, in the embodiment illustrated in FIG. 12, a line control process 152 for a particular telephone number is created at each call manager 26 which receives a request from a telephony device 22 to be associated with the telephone number.

As an example, assume that telephony device 22a communicates a request to be associated with telephone number '1000'. Device process 108a sends a line registration request to line manager 150a indicating the requested line appearance for telephone number '1000', as indicated by arrow 602. Line manager 150a communicates the requested telephone number to digit analysis module 104a, as indicated by arrow 604, so that digit analysis module 104a may determine whether a local line control process 152 (a line process 152 executing in call manager 26a) has already been created and associated with telephone number '1000'. Assuming that digit analysis module 104a does not find a local line control process 152 at call manager 26a associated with telephone number '1000', digit analysis module 104a signals line manager 150a to report this as indicated by arrow 606.

Line manager 150a sends a command that creates a local line control process 152a for telephone number '1000', as indicated by arrow 608. Line manager 150a determines the PID or other location information associated with the local line control process 152a, and communicates this PID to digit analysis module 104a, as indicated by arrow 610. Alternatively, line control process 152a may communicate its PID to digit analysis module 104a. Digit analysis module 104a associates this PID with telephone number '1000' in registration information table 110a. This association is made in the same manner that telephone numbers are associated with PIDs of device processes 108a, as described above. Line manager 150a also sends a command to create a lock manager 156a associated with line control process 152a, as indicated by arrow 612. The purpose of lock manager 156a is described below.

Line manager 150a communicates the PID or other location information associated with line control process 152a to device process 108a, as indicated by arrow 614. Device process 108a then sends a registration request, including the PID of device process 108a, to line control process 152a, as indicated by arrow 616. Line control process 152a stores the PID of device process 108a in a line control database 154a.

In summary, the registration process for telephony device 22a illustrated in FIG. 12 is similar to the registration process for telephony device illustrated in FIG. 9. One difference is that a lock manager 156a is created and associated with line control process 152a. However, the registration process associated with a request from a second telephony device 22e (controlled by call manager 26b) to be associated with telephone number '1000' is somewhat different than the process described in FIG. 9 in conjunction with the registration of telephony device 22e. The difference stems from the fact that a line control process 152 for telephone number '1000' is created at each call manager 26 at which a telephony device 22 requests registration with telephone number '1000'. Therefore, the registration process, as illustrated in sequence by arrows 620-634, is similar to the registration process of telephony device 22a in FIG. 12.

Assuming that another telephony device 22 controlled by call manager 26b has not already requested to be registered with telephone number '1000', and thus a line control process 152 for telephone number '1000' has not been created at call manager 26b, the registration process illustrated by arrows 620-634 includes the creation of a line control process 152b and an associated lock manager 156b, as described above. Thus, each call manager 26 controlling a telephony device 22 registered with telephone number '1000' has an associated line control process 152. Thereafter, if any additional telephony devices 22 controlled by call managers 26a or 26b were to request registration with telephone number '1000', line managers 150a or 150b, respectively, would register the telephony device 22 with the existing line control process 152a or 152b.

As with the single line control process 152a of the embodiment described in conjunction with FIG. 9, the PIDs of line control processes 152a and 152b of FIG. 12 are replicated from their respective call managers 26a and 26b using the registration information table replication process described above, as indicated by arrow 636. After such replication, the registration information table 110 of each call manager 26a and 26b will include the PIDs of line control processes 152a and 152b associated with telephone number '1000'. The PIDs of any other line control processes 152 created at other call managers 26 will also be included in the registration information table 110 of each call manager 26.

Figure 13:
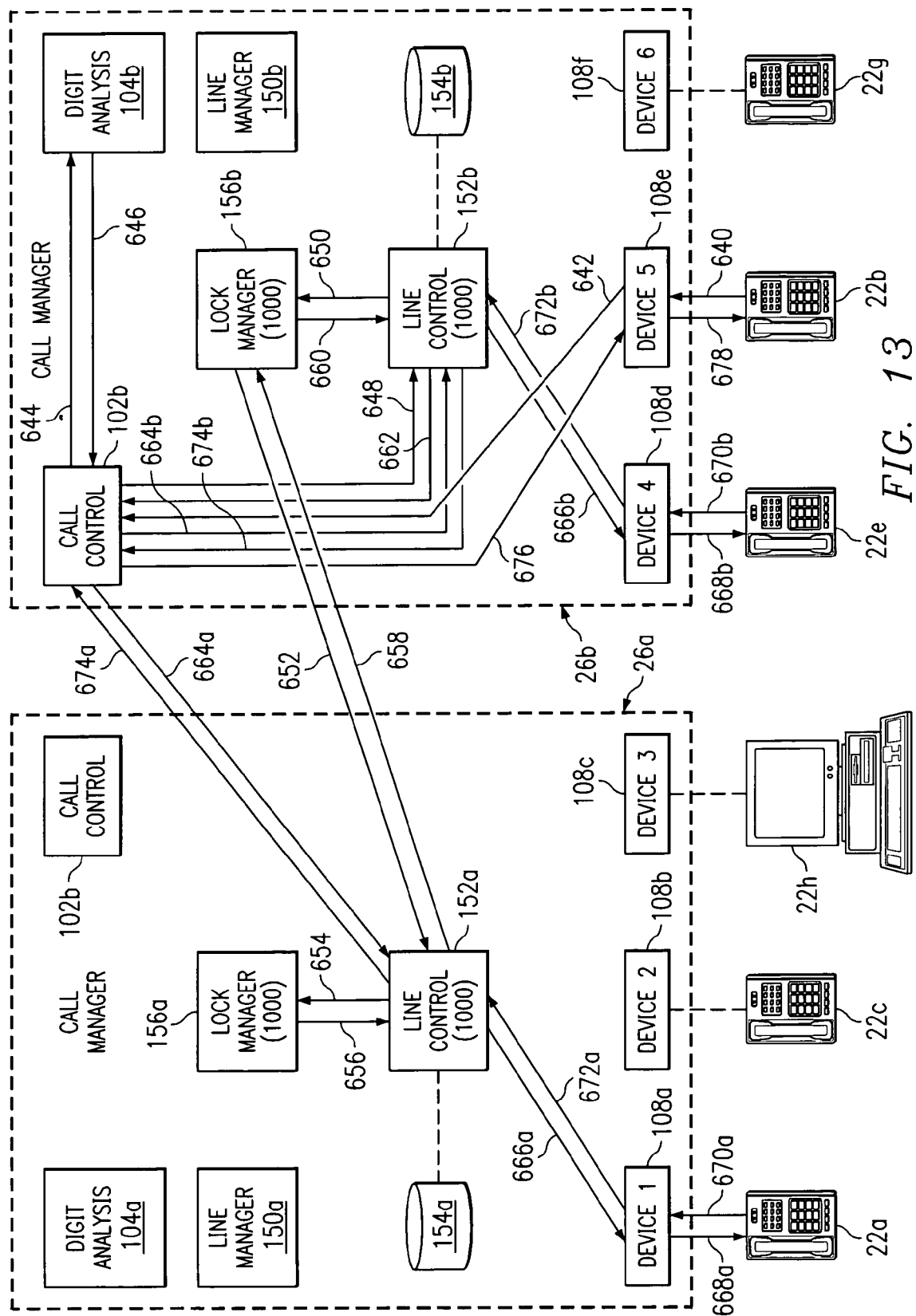
FIG. 13 illustrates an exemplary call routing process between call managers using the line control processes of FIG. 12.

FIG. 13 illustrates an exemplary call routing process between call managers 26a and 26b using line control processes 154a and 154b. As with FIG. 11, although FIG. 13 illustrates call managers 26a and 26b and certain devices 22, 24 controlled by call managers 26a and 26b, it should be understood that this description applies to call routing between any devices 22, 24 controlled by any call manager(s) 26 in communication network 10. Furthermore, although FIG. 13 illustrates a series of communications between different modules or processes in call managers 26a and 26b, other appropriate intermediary modules or processes may be involved in these communications, and the functions of one or more of the described modules or processes may be divided between multiple components or combined in a single component.

When a user wishes to place a call from IP telephony device 22b to telephony devices 22 having a line appearance associated with telephone number '1000', calling telephony device 22b communicates a call request signal including telephone number '1000' to its associated device process 108e executing in call manager 26b, as indicated by arrow 640. Device process 108e communicates the call request to call control module 102b as indicated by arrow 642, and call control module 102b communicates the called telephone number to digit analysis module 104b, as indicated by arrow 644. Call control module 102b may communicate the telephone number to digit analysis module 104b as a whole or it may communicate each digit of the telephone number successively. Digit analysis module 104b obtains the PID or other location information associated with telephone number '1000' in registration information table 110b (in this example, the PIDs of line control processes 152a and 152b), and communicates this location information to call control module 102b, as indicated by arrow 646.

Call control module 102b communicates the call request to the line control process 152 whose PID is listed first in registration information table 110b. Call control module 102b also communicates the PIDs of any other line control processes 152 associated with telephone number '1000' in registration information table 110b. For example, assume that line control process 152b is listed first in registration information table 110b. Call control module 102b thus communicates the call request and the PID of line control process 152a to line control process 152b, as indicated by arrow 648. Alternatively, call control module 102b could send the call request and the PID of line control process 152b to line control process 152a.

Line control processes 152a and 152b are locked during the processing of a call request so that if a second call request is initiated to telephone number '1000', the second call request will be put on hold until the first call request is resolved. Lock managers 156 are used to implement this locking scheme. After receiving the call request and PID of line control process 152a, line control process 152b communicates a lock request signal to its associated lock manager 156b, as indicated by arrow 650. This lock request signal includes the PID of line control process 152*a*. Lock manager 156*b* determines whether line control process 152*b* is already in a locked condition. If line control process 152*b* is not locked, lock manager 156*b* communicates a remote lock request signal to line control process 152*a*, as indicated by arrow 652. If other line control processes 152 were involved, lock manager 156*b* would also send remote lock requests to these line control processes 152.

Line control process 152*a* communicates the remote lock request to its associated lock manager 156*a*, as indicated by arrow 654, and lock manager 156*a* determines whether line control process 152*a* is in a locked condition. If line control process 152*a* is not already locked, lock manager 156*a* communicates a lock response signal to line control process 152*a* indicating that the remote lock request has been granted, as indicated by arrow 656. Line control process 152*a* communicates the lock response signal to lock manager 156*b* as indicated by arrow 658. Any other line control processes 152 to which a remote lock request was communicated from lock manager 156*b* would also return a lock response signal (after being locked as described above). Lock manager 156*b* communicates a lock response signal to line control process 152*b* indicating that the lock request has been granted by lock manager 156*a*, as indicated by arrow 660. Line control process 152*b* then communicates a signal to call control module 102*b* indicating that the call request may be processed, as indicated by arrow 662. If one or more line control processes 152 are already locked and do not grant the lock request, the call request may be placed on hold or communicated only to the line control processes 152 that granted the lock request.

Call control module 102*b* communicates the call request to line control processes 152*a* and 152*b*, as indicated by arrows 664*a* and 664*b*. Call control module 102*b* may communicate the call request to each line control process 152*a*, and 152*b* either substantially simultaneously ("in parallel") or sequentially ("in series"). If sent in series, call control process 102*b* may wait to receive a response to the call request from one line control process 152 before communicating the call request to the next line control process 152. Line control processes 152*a* and 152*b* communicate the call request to their associated device processes 108 using the PIDs stored in their respective line control databases 154*a* and 154*b*. In the illustrated embodiment, only one device process 108 is associated with each line control process, however, other telephony devices 22 controlled by the same call manager 26 in which the line control process 152 is executing may also be included in the associated line control database 154.

In the illustrated embodiment, line control process 152*a* communicates the call request to device process 108*a*, and line control process 152*b* communicates the call request to device process 108*d*, as indicated by arrows 666. Device processes 108*a* and 108*d* communicate the call request to their respective telephony devices 22*a* and 22*e*, as indicated by arrows 668. If either telephony device 22*a* or 22*e* is available to communicate with telephony device 22*b*, telephony device 22*a* or 22*e* communicates a call proceed signal to its respective device process 108*a* or 108*d*, as indicated by arrows 670. Device processes 108*a* and 108*d* communicate the call proceed signals to line control processes 152*a* and 152*b*, respectively, as indicated by arrows 672. Line control processes 152*a* and 152*b* then communicate the call proceed signals to call control module 102*b*, as indicated by arrows 674.

If call control module 102*b* communicated the call requests to line control processes 152*a* and 152*b* in parallel, and if telephony devices 22*a* and 22*e* both accept the call, call control module 102*b* may set up the call with the telephony device 22 from which call control module 102*b* first receives a call proceed signal. Alternatively, call control module 102*b* may set up a three-way call between telephony devices 22*a*, 22*b* and 22*e*. Call control module 102*b* sets up the call by communicating a call proceed signal (indicating that telephony devices 22*a* and/or 22*e* accepted the call) to device process 108*e*, as indicated by arrow 676. Device process 108*e* signals telephony device 22*b*, as indicated by arrow 678, and instructs telephony device 22*b* to establish media (audio and/or video) streaming with called telephony device(s) 22*a* and/or 22*e*, as described above, to establish the call.

Because a device 22, 24 can register a call manager 26 that is located in a different geographic area than the geographic area in which the device 22, 24 is located, complications may arise when a call needs to be routed to or from the device 22, 24 based on geographic factors. For example, assume that telephony device 22*b* is physically located in Dallas and coupled to LAN 20*a*, but that it registers with and is controlled by call manager 26*c* located in San Jose. If a user of telephony device 22*b* dials 911, the call needs to be routed to emergency services in Dallas, not in San Jose. Furthermore, in order to reduce or eliminate long distance charges, calls from telephony device 22*a* to the San Jose area should be routed through San Jose gateway device 24*c* rather than through a Dallas gateway device 24*a* or 24*b*.

In addition to location-specific call routing, calls to or from particular telephony devices 22, 54, 68 may need to be restricted for various reasons. For example, if a landlord of a building provides a LAN 20 and a call manager 26 to multiple tenants (for example, multiple businesses or other organizations) of the building, each tenant needs to be provided with its own dialing plan. This dialing plan may include a set of internal extensions numbers that are partitioned from the internal extensions of the other tenants. In addition, it may be desirable to provide different classes of users in an organization with different levels of dialing access. For example, low-priority users may be prevented from placing certain types of calls, such as long distance calls.

Dialing partitions may be used to implement the location-specific, tenant-specific and user-specific dialing arrangements described above, as well as any other appropriate call routing distinctions. Dialing partitions are implemented by assigning every telephone number that may be called, both internal and external numbers, to a particular dialing partition. Multiple telephone numbers may be represented by a telephone number pattern. Again, the term "telephone number" in this description refers to both complete telephone numbers (no wildcards) and telephone number patterns including wildcards. Each device 22, 24 is assigned a partition search space that includes the names of one or more of these dialing partitions. A telephony device 22, 54, 68 having a particular telephone number may be called only if the partition search space of the calling device 22, 24 contains a dialing partition that includes the telephone number. The dialing partition(s) in which the telephone number is included associates a routing target with the telephone number indicating a destination to which the call request should be communicated. When a device 22, 24 communicates a call request to a call manager 26, the digit analysis module 104 of the call manager 26 attempts to determine the routing target associated with the telephone number in the call request by searching in the dialing partitions that are listed in the partition search space of the calling device 22, 24. The routing target may be a PID of a device process 108, a route list control process 134, a line control process 152, or any other appropriate destination.

Figure 14:
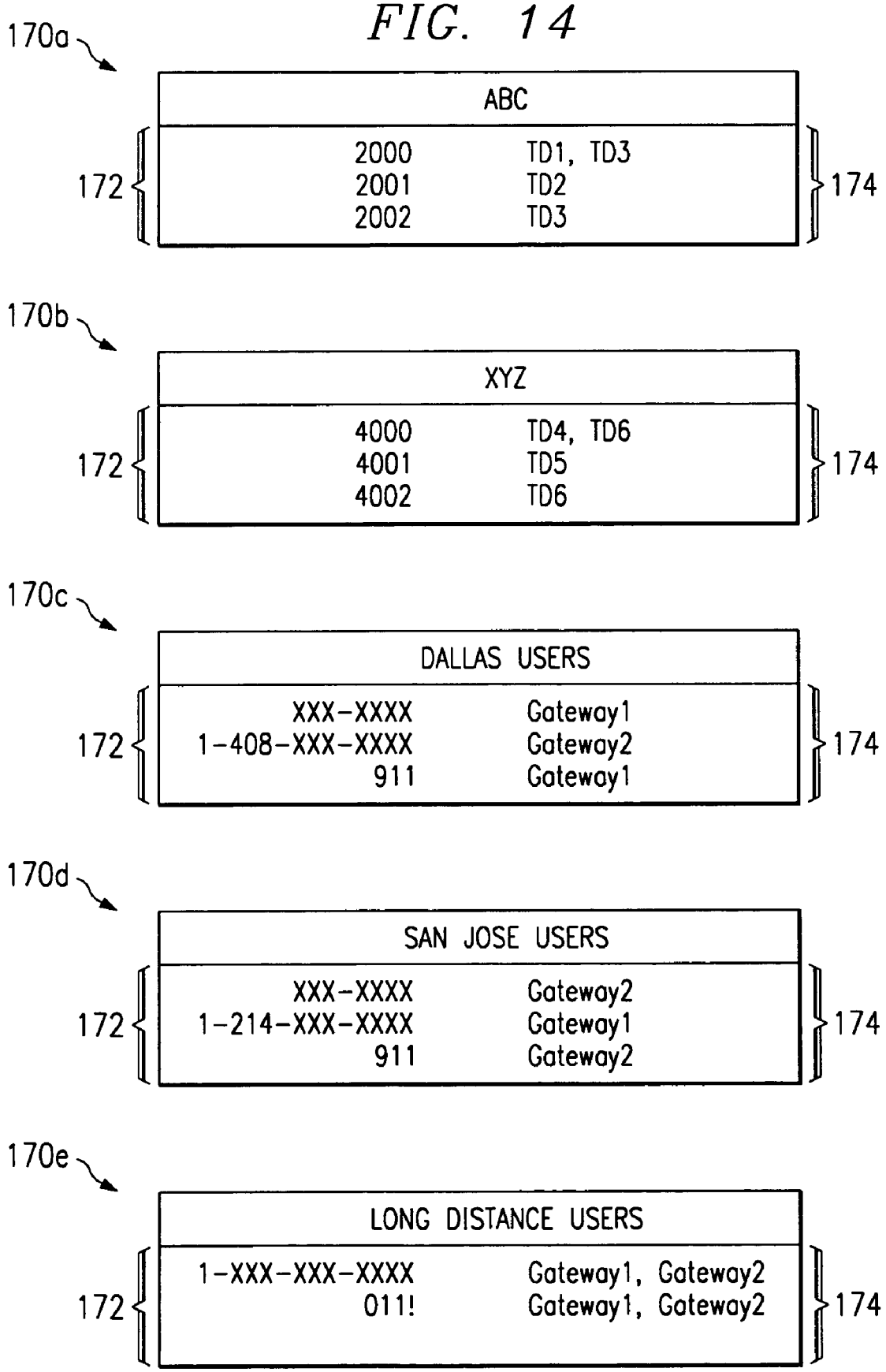
FIG. 14 illustrates exemplary dialing partition tables for use in routing calls in the communication network.

FIG. 14 illustrates exemplary dialing partition tables 170. In an embodiment of communication network 10 using dialing partition tables 170, registration information table 110 is logically replaced by dialing partition tables 170. Dialing partition tables 170 may be stored in any appropriate database associated with each call manager 26. As with registration information table 110, dialing partition tables 170 associate a telephone number 172 with a routing target 174. For the purposes of clarity, the routing targets 174 listed in dialing partition tables 170 of FIG. 14 are names of devices 22, 24 illustrated in FIG. 15. Alternatively, routing targets 174 may be the PID of a device process 108 controlling a device 22, 24, a route list control process 134 providing access to multiple gateway devices 24, or a line control process 152 providing access to multiple telephony devices 22 sharing a line appearance. Each dialing partition table 170 includes a subset of all dialable telephone numbers 172. Optimally, every telephone number that an administrator wants to be accessible will be included in at least one dialing partition table 170 (either the actual telephone numbers or a pattern including the number). If telephone number 172 in more than one dialing partition table 170 match the sequence of dialed digits in the call request, then digit analysis module 104 chooses the telephone number 172 that is the closest match. If two or more of the matching telephone numbers 172 are identical, digit analysis module 104 selects the telephone number 172 associated with the dialing partition table 170 listed first in the calling device's partition search space.

Figure 15:
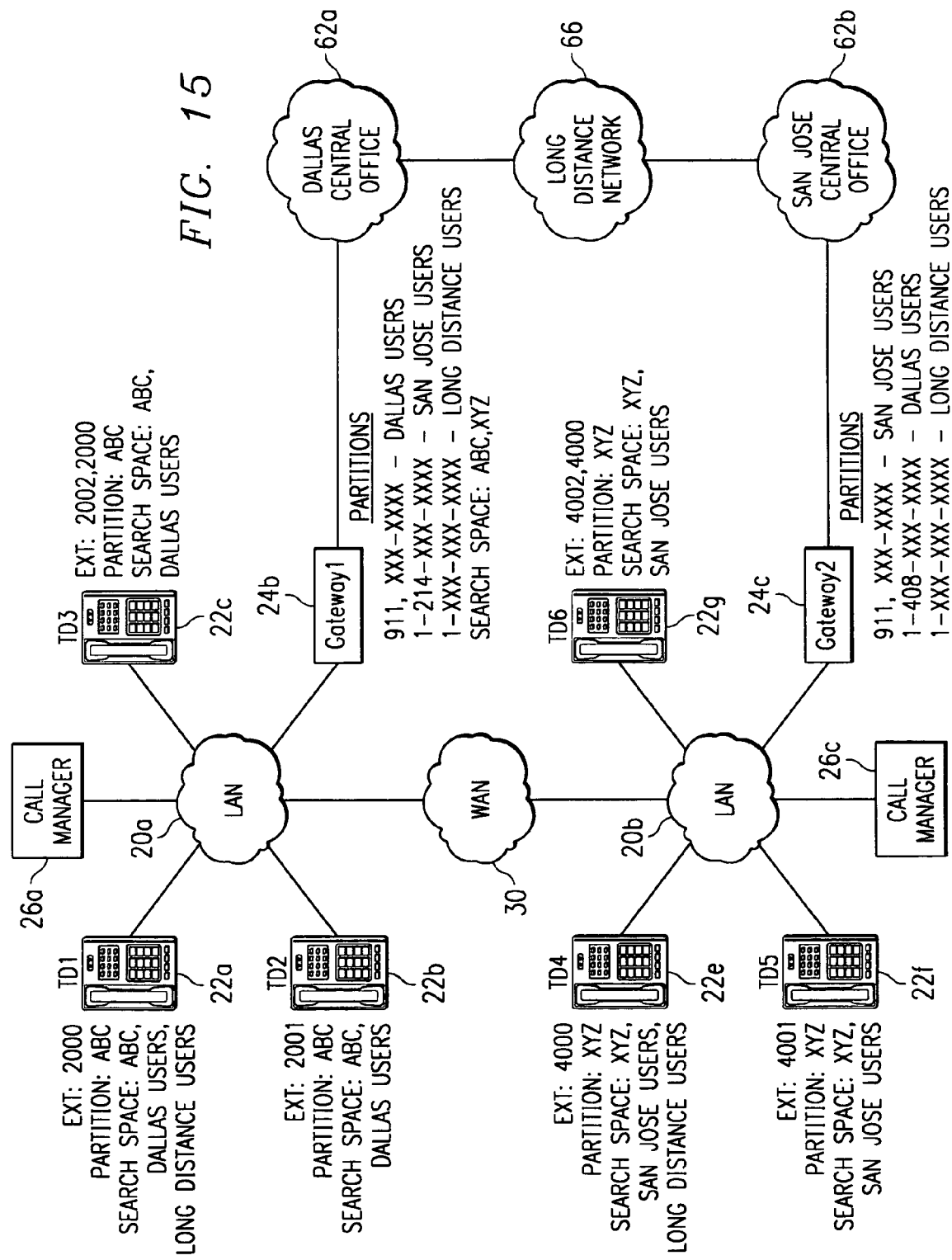
FIG. 15 illustrates an exemplary portion of the communication network to demonstrate the use of dialing partition tables and partition search spaces.

FIG. 15 illustrates an exemplary portion of the communication network 10 to demonstrate the use of dialing partition tables and partition search spaces. In the illustrated embodiment, telephony devices 22a-c, 22e-g and gateway devices 24b, 24c are controlled by call manager 26a. Although devices 22, 24 are described as being controlled by a single call manager 26a, it should be understood that the following description applies equally where one or more of devices 22, 24 are controlled by one or more other call managers 26. The exemplary embodiment illustrated in FIG. 15 uses dialing partition tables 170 to implement the dialing plan based on multiple tenants sharing the same IP network, multiple classes of users, and multiple geographic locations.

The exemplary embodiment includes two different companies (tenants), ABC and XYZ, having telephony devices 22 coupled to and sharing the same IP network (including LANs 20a and 20b and WAN 30). Company ABC has three employees and three corresponding telephony devices 22a-c, all located in Dallas. Company XYZ has three employees and three corresponding telephony devices 22e-g, all located in San Jose. Each company is a tenant of a landlord owning and controlling LANs 20a and 20b, WAN 30, call manager 26a and gateway devices 24b and 24c. Each company has two classes of employees, those who are allowed to make long distance calls and those who are not. Dialing partition tables 170 of FIG. 14 and the partition search spaces listed in FIG. 15 are used to implement the following dialing plan.

When an employee of either company dials a seven-digit "local" telephone number from a telephone device 22, the call should be routed out of a gateway device 24 that is located in the same geographic location as the calling telephony device 22. When an employee in a first geographic region dials a eleven-digit "long distance" telephone number ('1-xxx-xxx-xxxx') that represents a local number in a second geographic region, instead of routing the call out of a gateway device 24 in the first geographic region (and having it treated as a long distance call), the call should be routed through a gateway device 24 located in the second geographic region (in which the call is a local call). For example, if any employee of XYZ in San Jose dials '1-214-555-5000' ('214' being an area code in Dallas), the call should be routed through gateway device 24b and placed as a local call. Furthermore, if an employee of either ABC or XYZ places a long distance call using an area code other than a local area code in Dallas or San Jose, the call should only be routed if the employee has long distance calling privileges. If so, the call may be placed through any gateway device 24 (or a gateway device 24 may be selected based on load, cost, or any other appropriate considerations).

The dialing plan described above is implemented by selectively assigning internal and external telephone numbers to particular dialing partition tables 170 and assigning each device 22, 24 a particular partition search space. Dialing partition tables 170 illustrated in FIG. 14 are created to implement the dialing plan. In the illustrated embodiment, internal telephone extensions '2000', '2001' and '2002' are associated with telephony devices 22a, 22b and 22c, respectively, and are included in an ABC dialing partition table 170a. In ABC dialing partition table 170a, each of these telephone numbers 172 is associated with an appropriate routing target 174. As described above, although the routing target may be a PID of a device process 108, a route list control process 134, a line control process 152, or any other appropriate process, each telephone number 172 is shown in FIG. 14 as being associated with the name of a device 22, 24 to clearly indicate the device 22, 24 to which a call is routed when a particular telephone number is included in a call request. For example, extension '2000' is associated in ABC dialing partition table 170a with 'TD1' and 'TD3', corresponding to telephony devices 22a and 22c, instead of being associated with the PID of a line control process 152 controlling extension '2000' or any other appropriate type of association.

As with the extensions of telephony devices 22a-c of ABC, the extensions associated with telephony devices 22e-g of XYZ are associated with routing targets in an XYZ dialing partition table 170b. Since there are multiple tenants (ABC and XYZ) sharing the same IP network and call manager 26a, a dialing partition table 170 is created for the extensions of telephony devices 22 of each tenant. As will be described below, the creation of a dialing partition table 170 for each tenant allows the tenants to use identical extension numbers.

In addition to creating a dialing partition table 170 for each tenant, dialing partition tables 170 are also created to differentiate between external telephone numbers based on the location of the external telephony device 54, 68 with which the telephone number is associated and the cost class of the call to the external telephone number (for example, local vs. long distance server provider rates, time of day, total usage, etc.). Since two geographic areas are involved in the illustrated embodiment, there are two local number partition tables, one for Dallas and one for San Jose. A Dallas users dialing partition 170c includes telephone numbers that can be placed as local calls from a telephony device 22 in the Dallas area. These telephone numbers include numbers that may be placed locally through Dallas gateway device 24b, such as '911' and any seven-digit telephone number, and numbers that would typically be long distance to a Dallas user, but that may be dialed locally through San Jose gateway device 24c (such as eleven-digit telephone numbers using the San Jose '408' area code). Telephone numbers which can be reached locally through Dallas gateway device 24b are associated with gateway device 24b in dialing partition table 170c. These telephone numbers may be associated with a PID of a device process 108 controlling gateway device 24b or a PID of a route list control process 134 that includes gateway device 24b in its associated route list. The telephone numbers in Dallas users dialing partition table 170c that may be dialed locally using San Jose gateway device 24c are associated in Dallas users dialing partition table 170c with gateway device 24c.

A San Jose users dialing partition table 170d is created in a similar manner as Dallas users dialing partition table 170c. Seven-digit telephone numbers, 911, and any other telephone numbers of external telephony devices 54, 68 in San Jose are included in San Jose users dialing partition table 170d and are associated with San Jose gateway device 24c. Eleven-digit telephone numbers including the '214' area code are also included in San Jose users dialing partition table 170d and are associated with Dallas gateway device 24b (since calls to the '214' area code may be placed locally through Dallas gateway device 24b).

This description assumes that all numbers having an area code of '214' or '408' may be dialed locally using gateway devices 24b and 24c, respectively. However, cities other than Dallas and San Jose may be included in the same area codes, but calls made to telephone numbers in those cities may not be placed as local calls from Dallas or San Jose (for example, intrastate calls in a state having a single area code). Furthermore, large cities such as Dallas and San Jose may have multiple area codes that may all be dialed locally using gateway devices 24b and 24c, respectively. The dialing plan in such large cities also may require that all local calls be placed using an area code (and thus there would be no valid seven-digit telephone numbers in that city). This description assumes that Dallas and San Jose only have one area code and that local calls may be placed in Dallas and San Jose without using the local area code. However, dialing partition tables 170 may be modified to account for multiple area codes and the use of local ten-digit numbers.

"Long distance" telephone numbers (those telephone numbers unable to be dialed locally using either gateway device 24b or 24c) are included in a long distance users dialing partition table 170e. Dialing partition table 170e may include a pattern representing all telephone numbers having eleven digits (it is not necessary to exclude eleven-digit telephone numbers having a '214' or '408' area code, as will be described below). Telephone numbers beginning with '011' (international calls) or any other long distance telephone numbers representing long distance numbers may also be included in dialing partition table 170e. Since the telephone numbers 172 included in long distance users dialing partition table 170e may not be dialed locally using either gateway device 24b or 24c, telephone numbers 172 may be associated with either gateway device 24. In the exemplary long distance users dialing partition table 170e, each of these telephone numbers 172 is associated with both gateway devices 24b and 24c. This association may be accomplished by associating the telephone numbers 172 with a PID of a route list control process 134 controlling a route list that includes both gateway devices 24b and 24c. Alternatively, long distance users dialing partition table 170e could specify long distance telephone numbers by area code and associate a set of telephone numbers having a particular area code with the gateway device 24 that may place the long distance call for the least cost.

The dialing plan is implemented by assigning each device 22, 24 one or more dialing partition tables 170 that may be used to determine a routing target associated with a telephone number included in a call request from the device 22, 24. The dialing partition tables 170 assigned to each device 22, 24 form the device's partition search space. Since telephone calls from external telephony devices 54, 68 to telephony devices 22 are communicated through a gateway device 24, gateway devices 24 need access to telephony devices 22. Therefore, the partition search space of each gateway device 24 includes the dialing partition tables 170 that include the extensions of telephony devices 22, which in the illustrated embodiment are ABC dialing partition table 170a and XYZ dialing partition table 170b.

In the illustrated embodiment, the dialing partition tables 170 are assigned to the partition search space of telephony devices 22 based on the geographic location of the telephony device 22, the tenant with which the telephony device 22 is associated, and the class of user using the telephony device 22. Employees of ABC need to be able to call other employees of ABC. Therefore, telephony devices 22a-c each include ABC dialing partition table 170a in their partition search space. Furthermore, all employees of ABC company are allowed to make local calls (for example, calls to both Dallas and San Jose telephone numbers). Therefore, the partition search space of telephony devices 22a-c also includes Dallas users dialing partition table 170c. Finally, although regular employees of ABC are not allowed to place long distance calls, managers of ABC are allowed to place these types of calls. Assuming that the user of telephony device 22a is a manager, the partition search space of telephony device 22a also includes the long distance users dialing partition table 170e.

It should be noted that telephony device 22c shares a line appearance (extension '2000') with telephony device 22a. For example, the user of telephony device 22c may be the assistant of the manager using telephony device 22a. If the assistant is not allowed to place long distance calls, then long distance users dialing partition 170e is not included in the partition search space of telephony device 22c. Therefore, the user of telephony device 22a is allowed to place long distance calls while the user of telephony device 22c is not, even though telephony device 22c shares a line appearance with telephony device 22a. This differentiation between telephony devices 22 sharing a line appearance can be made since the partition search space of a telephony device 22 may be associated with the MAC address, the device name, or some other identifier of the telephony device 22, as well being associated with a line appearance assigned to the device.

Furthermore, although a single dialing partition is illustrated as being associated with each device 22, 24, each device 22, 24 may have an associated dialing partition for each line number that is assigned to the device 22, 24. For example, a partition search space excluding long distance users dialing partition 170e may be associated with line '2002' of telephony device 22c, and a partition search space including long distance users dialing partition 170e may be associated with line '2000' of telephony device 22c. In this case, the assistant using telephony device 22c is not allowed to place long distance calls from telephony device 22c using line '2002', but the assistant is able to place long distance calls from telephony device 22c using line '2000'. This differentiation is possible since partition search spaces may be assigned based on both the device 22, 24 and based on the line number, so that different line appearances on the same telephony device 22 may be associated with different partition search spaces.

Dialing partition tables 170 are assigned to the partition search spaces of telephony devices 22*e-g* of XYZ in a similar manner as described above. Employees of XYZ need to be able to call other employees of XYZ. Therefore, telephony devices 22*e-g* each include XYZ dialing partition table 170*b* in their partition search space. Furthermore, all employees of XYZ are allowed to make local calls (for example, calls to both Dallas and San Jose telephone numbers). Therefore, the partition search space of telephony devices 22*e-g* also includes San Jose users dialing partition table 170*d*. Finally, although regular employees of XYZ are not allowed to place long distance calls, managers in XYZ are allowed to place these types of calls. Assuming that the user of telephony device 22*e* is a manager, the partition search space of telephony device 22*e* also includes long distance users dialing partition table 170*e*.

As noted above, although devices 22, 24 are described as being controlled by a single call manager 26*a*, devices 22, 24 may controlled by multiple call managers 26, such as call managers 26*a* and 26*c*. In this case, the control of devices 22, 24 may be split between call managers 26*a* and 26*c* in any appropriate manner. Since either call manager 26*a* or 26*c* may receive a call request indicating a desire to communicate with a device 22, 24 which the other call manager 26 controls, each call manager 26*a* and 26*c* optimally include dialing partition tables 170 that include a telephone number(s) associated with all devices 22, 24 coupled to the relevant IP network (in this case, LANs 20*a*, 20*b* and WAN 30). Therefore, the information in dialing partition tables 170 should be updated and replicated between call managers 26*a* and 26*c* as described above in conjunction with registration information table 110.

When a telephone number 172 or a routing target 174 is created, modified or deleted based on the registration, unregistration, or loss of control of a device 22, 24, the call manager 26 making the creation, modification or deletion should notify all other call managers 26. Furthermore, when a call manager 26 comes on-line, the other call managers 26 should send the new call manager 26 a copy of dialing partition tables 170 (or a portion of dialing partition tables 170 relating to the devices 22, 24 that each call manager 26 controls). In addition, when a call manager 26 comes on-line, the other call managers 26 should delete the information in registration information tables 170 associated with devices 22, 24 that were controlled by the off-line call manager 26.

FIG. 16 illustrates a method of routing a call using dialing partition tables. The method begins when a call manager 26 receives a call request from a device 22, 24 at step 802. This call request includes a telephone number of the called telephony device 22, 54, 68. For example, assume that telephony device 22*a* sends a call request to call manager 26*a* indicating a desired communication with a PSTN telephony device 68 having a telephone number of '1-408-555-5000'. Call manager 26*a* determines which dialing partition tables 170 are included in the partition search space of telephony device 22*a* at step 804. This determination may be made based on a partition search space for telephony device 22*a* that is stored at call manager 26*a* in any appropriate database (such as the database where dialing partition tables are stored) or based on a partition search space sent by telephony device 22*a* with the call request. As indicated in FIG. 15, the partition search space of telephony device 22*a* includes the following partition tables: ABC dialing partition table 170*a*, Dallas users dialing partition table 170*c*, and long distance users dialing partition table 170*e*. Call manager 26*a* accesses each dialing partition table 170 in the order that they are listed in the partition search space to determine which telephone numbers 172 match '1-408-555-5000' at step 806. Call manager 26*a* determines at step 807 whether any matching telephone numbers 172 were found. If no matches were found, the method ends and the call is not placed. If one or more matches are found, call manager 26*a* determines the routing target 174 that is associated with each matching telephone number 172 in the associated dialing partition table 170 at step 808. Based on the dialing partition tables 170 illustrated in FIG. 14, call manager 26*a* finds matching telephone numbers 172 in the Dallas users dialing partition table 170*c* and the long distance users dialing partition table 170*e*. The matching telephone number 172 found in Dallas users dialing partition table 170*c* is '1-408-xxx-xxxx' and is associated with the routing target 'Gateway2' (which represents a routing target associated with gateway device 24*c*). The matching telephone number 172 found in long distance users dialing partition table 170*e* is '1-xxx-xxx-xxxx', which is associated with the routing targets 'Gateway1' and 'Gateway2' (which represent a routing target associated with gateway devices 24 *a* and 24*c*, such a route list control process 134).

Call manager 26*a* determines whether there is more than one matching telephone number 172 at step 810. Since there are two matching telephone numbers 172 in the example given, call manager 26*a* chooses the telephone number 172 that most closely matches the dialed telephone number at step 812. The telephone number '1-408-xxx-xxxx' in Dallas users dialing partition table 170*c* most closely matches the dialed telephone number. Call manager 26*a* then determines whether two or more identical telephone numbers 172 were chosen as most closely matching the dialed telephone number at step 814. In the example given, only one telephone number 172 was found to most closely match the dialed telephone number, so call manager 26*a* communicates the call request to the routing target 174 associated with the matching telephone number 172 at step 816. As described above, this routing target 174 is gateway device 24*c* (or more accurately, the device process 108 associated with gateway device 24*c* or a route list control process 134 associated with gateway device 24*c*). If there were two identical closest matching telephone numbers 172, call manager 26*a* would choose the telephone number 172 that was obtained from the dialing partition table 170 listed first in the partition search space at step 818.

When call manager 26*a* communicates the call request to the routing target 174 associated with the matching telephone number 172 at step 816, call manager 26*a* may truncate, add to, or otherwise modify the telephone number included with the call request based on the routing target. In the example given above, a San Jose number ('1-408-555-5000') was called from telephony device 22*a* in Dallas, and thus the user of telephony device 22*a* included the San Jose area code in the dialed number. However, since the routing target obtained from Dallas users dialing partition table 170*c* was San Jose gateway device 24*c*, the telephone number in the call request should be truncated to remove the '1' and the '408' area code (assuming that the area code is not required for local calls in San Jose). This truncation may be performed by either call manager 26*a* or gateway device 24*c*. In addition to the truncation described in the above example, any other appropriate modification of the called telephone number may be performed by any appropriate device in communication network 10.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims. For example, although certain modules, components, or processes in call managers 26 have been described, the functions of these modules, components, or processes may be performed by any module, component, or process of call managers 26 implemented as software or hardware.

What is claimed is:

1. A method of routing calls using dialing partitions, comprising:
   receiving a call request at a first call manager from a first device coupled to a packet-based network, the call request including a telephone number associated with a second device coupled to the packet-based network;
   accessing a dialing partition table based on a partition search space associated with the first device;
   determining a routing target associated with one or more telephone numbers in the dialing partition table that match the telephone number in the call request, wherein determining a routing target comprises determining the location of a route list control process associated with a plurality of gateway devices, each gateway device providing access to a telephone number that matches the telephone number in the call request; and
   communicating the call request to the routing target.

2. The method of claim 1, wherein receiving a call request at a first call manager from a first device comprises receiving a call request from an IP telephony device, the call request originating from the IP telephony device.

3. The method of claim 1, wherein receiving a call request at a first call manager from a first device comprises receiving a call request from a gateway device, the call request originating from a non-IP telephony device coupled to the gateway device.

4. The method of claim 1, wherein receiving a call request at a first call manager from a first device comprises receiving a call request from the first device including a telephone number associated with an IP telephony device.

5. The method of claim 1, wherein receiving a call request at a first call manager from a first device comprises receiving a call request from the first device including a telephone number associated with a non-IP telephony device coupled to the packet-based network using a gateway device.

6. The method of claim 1, further comprising:
   creating a plurality of dialing partition tables; and
   assigning one or more of the dialing partition tables to the partition search space associated with one or more devices.

7. The method of claim 6, wherein creating a plurality of dialing partition tables comprises creating a dialing partition table including one or more telephone numbers that are local telephone numbers when called from a first geographic area.

8. The method of claim 7, wherein the one or more telephone numbers that are local telephone numbers when called from a first geographic area comprise one or more telephone numbers associated with telephony devices located in a second geographic area and accessible from the first geographic area using a gateway device located in the second geographic area.

9. The method of claim 7, wherein assigning one or more of the dialing partition tables to the partition search space associated with one or more devices comprises assigning the dialing partition table to the partition search space of telephony devices allowed to place local calls.

10. The method of claim 6, wherein creating a plurality of dialing partition tables comprises:
    creating a first dialing partition table including one or more telephone numbers associated with a first organization sharing the packet-based network with a second organization; and
    creating a second dialing partition table including one or more telephone numbers associated with the second organization.

11. The method of claim 10, wherein assigning one or more of the dialing partition tables to the partition search space associated with one or more devices comprises:
    assigning the first dialing partition table to the partition search space of telephony devices associated with the first organization; and
    assigning the second dialing partition table to the partition search space of telephony devices associated with the second organization.

12. The method of claim 6, wherein assigning one or more of the dialing partition tables to the partition search space associated with one or more devices comprises associating the dialing partition tables with an identifier of each device, such that devices having different identifiers but sharing a line appearance may have different partition search spaces.

13. The method of claim 6, wherein assigning one or more of the dialing partition tables to the partition search space associated with one or more devices comprises associating the dialing partition tables with both an identifier of a device and a line appearance assigned to the device, such that a device may have a different partition search space associated with each line appearance assigned to the device.

14. The method of claim 6, wherein creating a plurality of dialing partition tables comprises creating a dialing partition table including one or more telephone numbers that that are long distance telephone numbers when called from a first geographic area.

15. The method of claim 6, wherein assigning one or more of the dialing partition tables to the partition search space associated with one or more devices comprises assigning the dialing partition table to the partition search space of telephony devices allowed to place long distance calls.

16. The method of claim 1, wherein accessing one or more dialing partition tables comprises accessing one or more dialing partition tables based on a partition search space received from the first device with the call request.

17. The method of claim 1, wherein accessing one or more dialing partition tables comprises accessing one or more dialing partition tables based on a partition search space stored by the first call manager and associated with the first device.

18. The method of claim 1, wherein determining a routing target associated with one or more telephone numbers in the dialing partition tables comprises determining the location of a device control process associated with a telephony device having a telephone number that matches the telephone number in the call request.

19. The method of claim 1, wherein determining a routing target associated with one or more telephone numbers in the dialing partition tables comprises determining the location of a device control process associated with a gateway device providing access to a telephony device having a telephone number that matches the telephone number in the call request.

20. The method of claim 1, wherein determining a routing target associated with one or more telephone numbers in the dialing partition tables comprises determining the location of a line control process associated with a telephone number that matches the telephone number in the call request.

21. The method of claim 1, wherein determining a routing target associated with one or more telephone numbers in the dialing partition tables comprises:
determining that two or more telephone numbers match the telephone number in the call request; and
selecting the telephone number that most closely matches the telephone number in the call request.

22. The method of claim 21, wherein selecting the telephone number that most closely matches the telephone number in the call request comprises:
determining that two or more telephone numbers most closely match the telephone number in the call request; and
selecting the telephone number from the dialing partition listed first in the partition search space.

23. The method of claim 1, wherein communicating the call request to the routing target comprises communicating the call request to a process executing at a second call manager.

24. The method of claim 1, further comprising modifying the telephone number included in the call request based on the routing target.

25. The method of claim 24, wherein modifying the telephone number included in the call request based on the routing target comprises truncating an area code from the telephone number.

26. The method of claim 24, wherein modifying the telephone number included in the call request based on the routing target comprises adding an area code to the telephone number.

27. A call manager, comprising:
a call control module operable to receive a call request from a first device coupled to a packet-based network, the call request including a telephone number associated with a second device coupled to the packet-based network;
a digit analysis module operable to:
receive the telephone number included in the call request from the call control module;
access one or more dialing partition tables based on a partition search space associated with the first device; and
determine a routing target associated with one or more telephone numbers in the dialing partition tables that match the telephone number in the call request, wherein the routing target comprises a route list control process associated with a plurality of gateway devices, each gateway device providing access to a telephone number that matches the telephone number in the call request; and
the call control module further operable to receive the routing target from the digit analysis module and to communicate the call request to the routing target.

28. The call manager of claim 27, wherein the first device comprises an IP telephony device, the call request originating from the IP telephony device.

29. The call manager of claim 27, wherein the first device comprises a gateway device, the call request originating from a non-IP telephony device coupled to the gateway device.

30. The call manager of claim 27, wherein the call request includes a telephone number associated with an IP telephony device.

31. The call manager of claim 27, wherein the call request includes a telephone number associated with a non-IP telephony device coupled to the packet-based network using a gateway device.

32. The call manager of claim 27, wherein the digit analysis module is further operable to:
create a plurality of dialing partition tables; and
assign one or more of the dialing partition tables to the partition search space associated with one or more devices.

33. The call manager of claim 32, wherein the digit analysis module is further operable to associate a dialing partition table with both an identifier of a device and a line appearance assigned to the device, such that a device may have a different partition search space associated with each line appearance assigned to the device.

34. The call manager of claim 27, wherein the digit analysis module is further operable to access one or more dialing partition tables based on a partition search space received from the first device with the call request.

35. The call manager of claim 27, wherein the digit analysis module is further operable to access one or more dialing partition tables based on a partition search space stored by the first call manager and associated with the first device.

36. The call manager of claim 27, wherein the routing target comprises a device control process associated with a telephony device having a telephone number that matches the telephone number in the call request.

37. The call manager of claim 27, wherein the routing target comprises a device control process associated with a gateway device providing access to a telephony device having a telephone number that matches the telephone number in the call request.

38. The call manager of claim 27, wherein the routing target comprises a line control process associated with a telephone number that matches the telephone number in the call request.

39. The call manager of claim 27, wherein the digit analysis module is further operable to:
determine that two or more telephone numbers match the telephone number in the call request; and
select the telephone number that most closely matches the telephone number in the call request.

40. The call manager of claim 39, wherein the digit analysis module is further operable to:
determine that two or more telephone numbers most closely match the telephone number in the call request; and
select the telephone number from the dialing partition listed first in the partition search space.

41. The call manager of claim 27, wherein the call control module is operable to communicate the call request to a process executing at a second call manager.

42. The call manager of claim 27, wherein the digit analysis module is further operable to modify the telephone number included in the call request based on the routing target.

43. Call manager software embodied in a computer-readable medium and operable to perform the following steps:
receive a call request from a first device coupled to a packet-based network, the call request including a telephone number associated with a second device coupled to the packet-based network;

access one or more dialing partition tables based on a partition search space associated with the first device;

determine a routing target associated with one or more telephone numbers in the dialing partition tables that match the telephone number in the call request, wherein the routing target comprises a route list control process associated with a plurality of gateway devices, each gateway device providing access to a telephone number that matches the telephone number in the call request; and communicate the call request to the routing target.

44. The call manager software of claim 43, further operable to:

create a plurality of dialing partition tables; and assign one or more of the dialing partition tables to the partition search space associated with one or more devices.

45. The call manager software of claim 43, further operable to access one or more dialing partition tables based on a partition search space received from the first device with the call request.

46. The call manager software of claim 43, further operable to access one or more dialing partition tables based on a partition search space stored by the first call manager and associated with the first device.

47. The call manager software of claim 43, further operable to:

determine that two or more telephone numbers match the telephone number in the call request; and select the telephone number that most closely matches the telephone number in the call request.

48. The call manager software of claim 47, further operable to:

determine that two or more telephone numbers most closely match the telephone number in the call request; and select the telephone number from the dialing partition listed first in the partition search space.

49. The call manager software of claim 43, further operable to communicate the call request to a process executing at a second call manager software.

50. The call manager software of claim 43, further operable to modify the telephone number included in the call request based on the routing target.

51. A call manager, comprising:

means for receiving a call request from a first device coupled to a packet-based network, the call request including a telephone number associated with a second device coupled to the packet-based network;

means for accessing one or more dialing partition tables based on a partition search space associated with the first device;

means for determining a routing target associated with one or more telephone numbers in the dialing partition tables that match the telephone number in the call request, wherein the routing target comprises a route list control process associated with a plurality of gateway devices, each gateway device providing access to a telephone number that matches the telephone number in the call request; and means for communicating the call request to the routing target.

52. The call manager of claim 51, further comprising:

means for creating a plurality of dialing partition tables; and means for assigning one or more of the dialing partition tables to the partition search space associated with one or more devices.

53. The call manager of claim 51, further comprising means for accessing one or more dialing partition tables based on a partition search space received from the first device with the call request.

54. The call manager of claim 51, further comprising means for accessing one or more dialing partition tables based on a partition search space stored by the first call manager and associated with the first device.

55. The call manager of claim 51, further comprising:

means for determining that two or more telephone numbers match the telephone number in the call request; and means for selecting the telephone number that most closely matches the telephone number in the call request.

56. The call manager of claim 55, further comprising:

means for determining that two or more telephone numbers most closely match the telephone number in the call request; and means for selecting the telephone number from the dialing partition listed first in the partition search space.

57. The call manager of claim 51, further comprising means for communicating the call request to a process executing at a second call manager software.

58. The call manager of claim 51, further comprising means for modifying the telephone number included in the call request based on the routing target.

* * * * *